(12) United States Patent
Nayak et al.

(10) Patent No.: US 11,518,516 B2
(45) Date of Patent: Dec. 6, 2022

(54) METHOD OF HANDLING AIRCRAFT CARGO FROM A PORTABLE PANEL

(71) Applicant: Goodrich Corporation, Charlotte, NC (US)

(72) Inventors: Sudhendra Nayak, Bilekahalli Bangalore (IN); Rameshkumar Balasubramanian, Karnataka (IN); Shad Kish, Jamestown, ND (US); Aaron J. Roberts, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 665 days.

(21) Appl. No.: 16/547,444

(22) Filed: Aug. 21, 2019

(65) Prior Publication Data
US 2020/0361607 A1    Nov. 19, 2020

(30) Foreign Application Priority Data

May 15, 2019 (IN) .............................. 201911019411

(51) Int. Cl.
| | |
|---|---|
| *B64D 9/00* | (2006.01) |
| *G06F 3/04883* | (2022.01) |
| *B64D 47/08* | (2006.01) |
| *B64D 45/00* | (2006.01) |
| *H04W 12/50* | (2021.01) |

(52) U.S. Cl.
CPC .......... *B64D 9/00* (2013.01); *B64D 45/0005* (2013.01); *B64D 47/08* (2013.01); *G06F 3/04883* (2013.01); *B64D 2009/006* (2013.01); *G06F 2203/04806* (2013.01); *H04W 12/50* (2021.01)

(58) Field of Classification Search
CPC ...................................................... B64D 9/00
See application file for complete search history.

(56) References Cited

U.S. PATENT DOCUMENTS

| | | | |
|---|---|---|---|
| 5,046,690 A * | 9/1991 | Nordstrom ................ | B64C 1/22 198/841 |
| 8,515,656 B2 | 8/2013 | Reed et al. | |
| 9,162,765 B2 | 10/2015 | Huber | |
| 9,908,706 B1 * | 3/2018 | Ribarov ................... | B64D 9/00 |
| 9,973,263 B2 | 5/2018 | Hathaway | |
| 2010/0100225 A1 * | 4/2010 | Reed ........................ | B64D 9/00 701/124 |

(Continued)

*Primary Examiner* — Timothy D Collins
*Assistant Examiner* — Brendan Kroger Schneider
(74) *Attorney, Agent, or Firm* — Cantor Colburn LLP

(57) ABSTRACT

Disclosed is a method of operating a Portable Cargo Panel (PCP) for an aircraft, including: detecting a gesture on a display of the PCP; determining that the gesture is a command to view on the display a first cargo compartment; securing a wireless connection with the first control panel therein; receiving, from the first control panel, a health state of each of a plurality of Cargo Handling Units (CHUs) therein; displaying, on the display, the first cargo compartment with the plurality of CHUs and the operational state of the plurality of CHUs; controlling one or more of the CHUs in the first cargo compartment by transmitting, to the first control panel, a command to: run a diagnostic test against the one or more of the plurality of CHUs; or control the plurality of CHUs to move a Unit Load Device (ULD) into, within or out of the first cargo compartment.

14 Claims, 17 Drawing Sheets

(56) References Cited

U.S. PATENT DOCUMENTS

| | | | |
|---|---|---|---|
| 2013/0297065 A1* | 11/2013 | Huber | B64D 9/00 |
| | | | 700/230 |
| 2019/0291769 A1* | 9/2019 | Kim | G06F 3/0482 |
| 2020/0223639 A1* | 7/2020 | Saini | B65G 39/18 |
| 2021/0039789 A1* | 2/2021 | Tsay | E05B 65/52 |

* cited by examiner

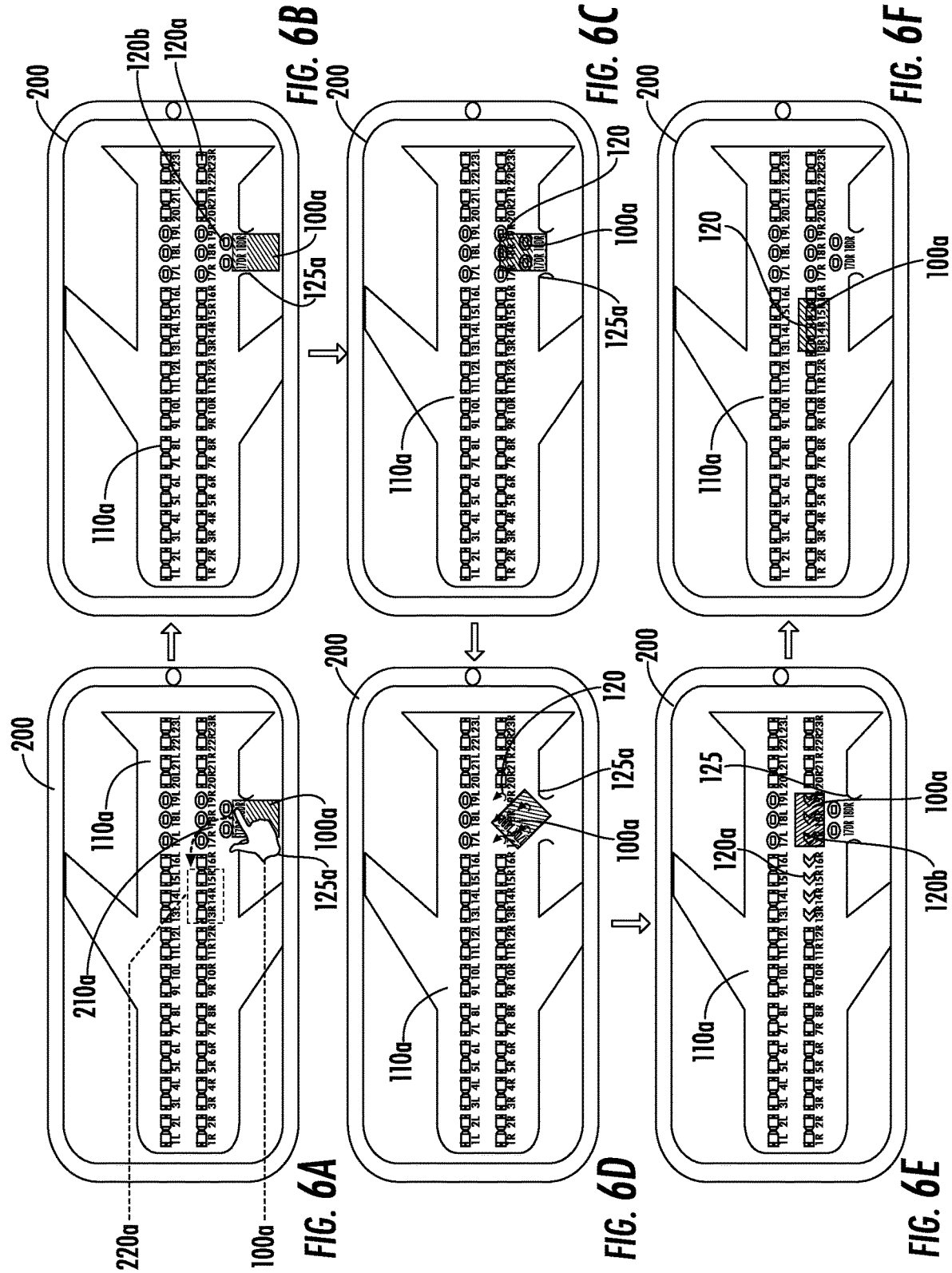

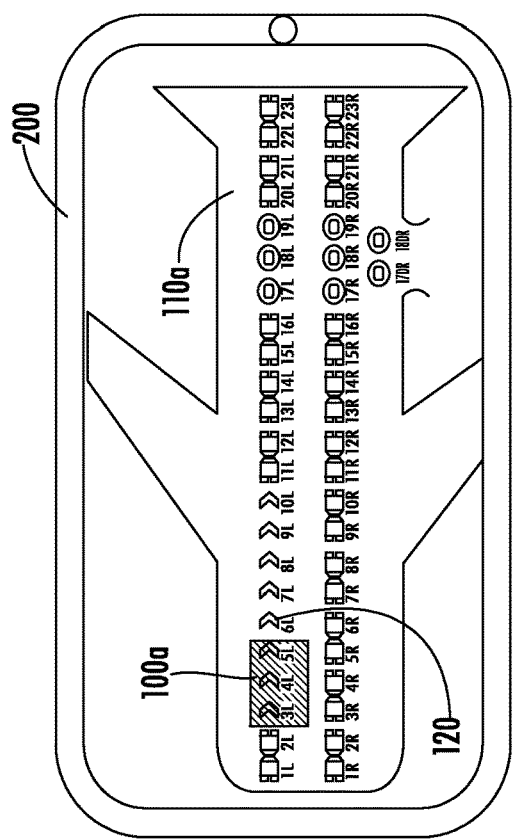
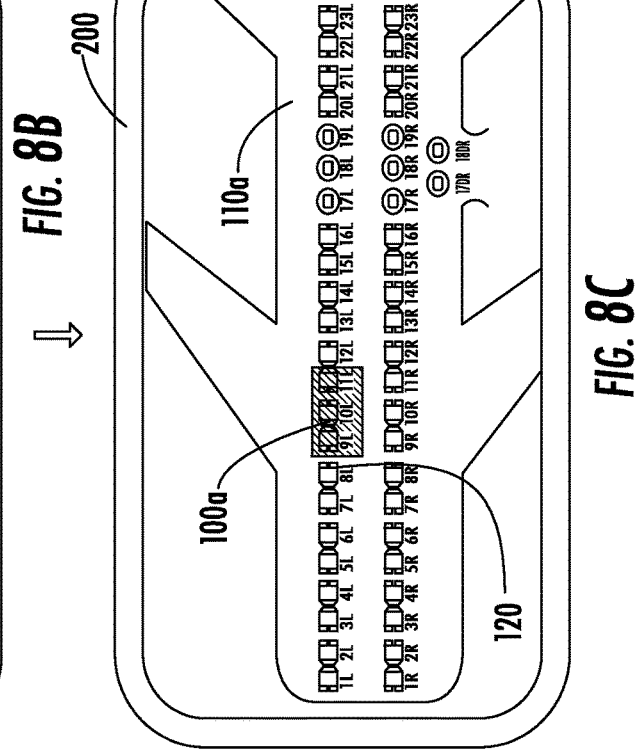
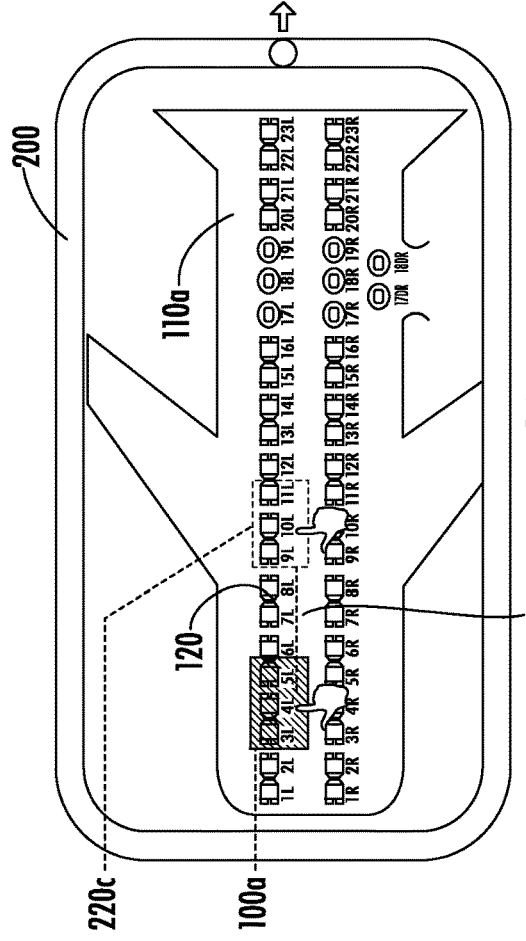
FIG. 8A
FIG. 8B
FIG. 8C

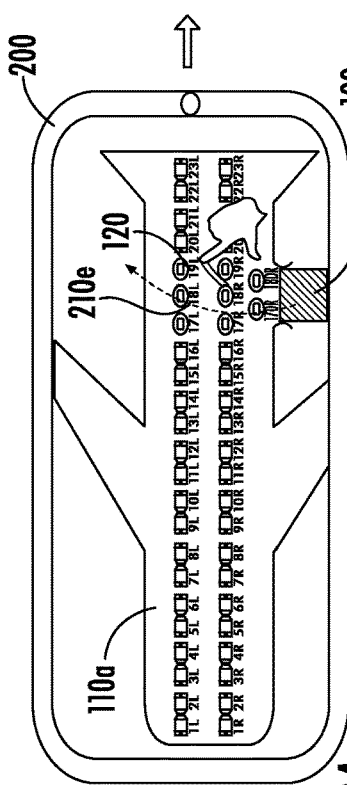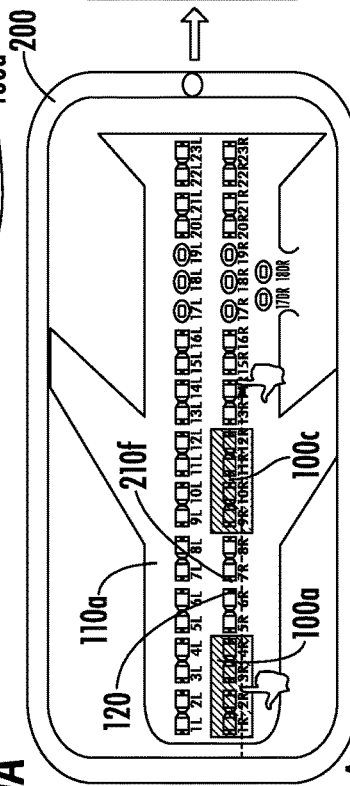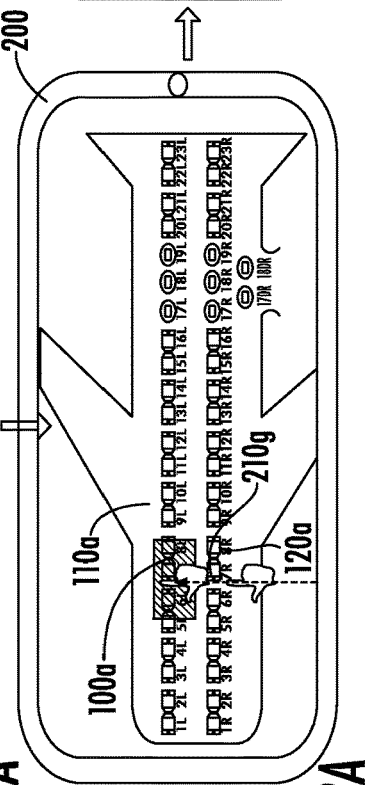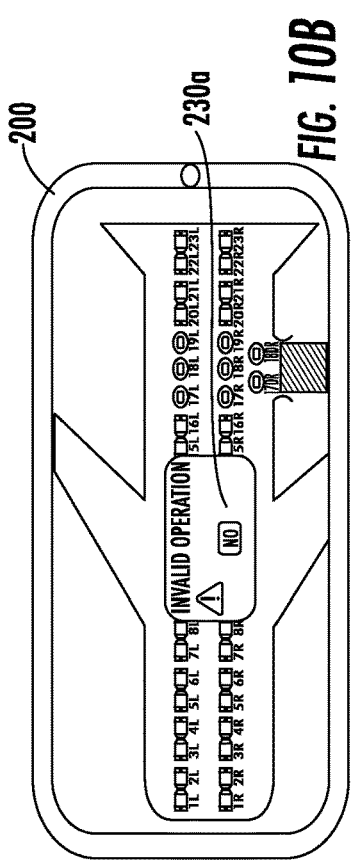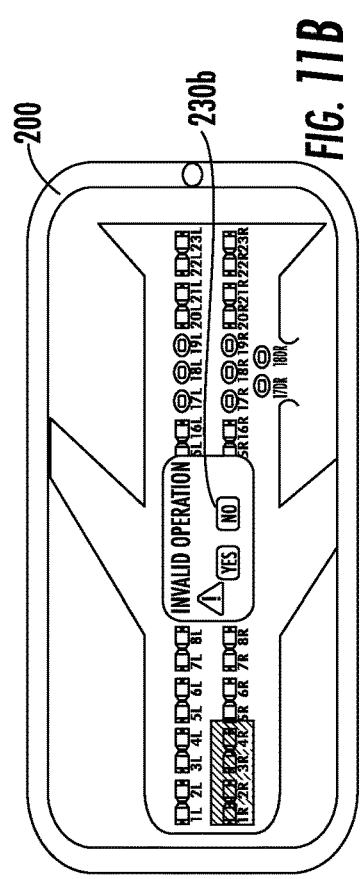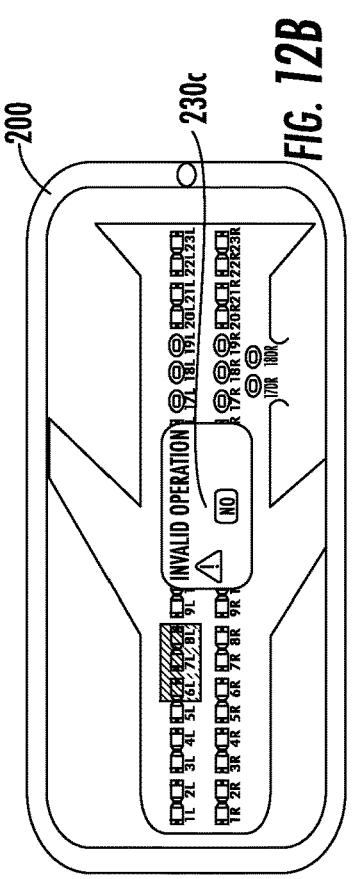

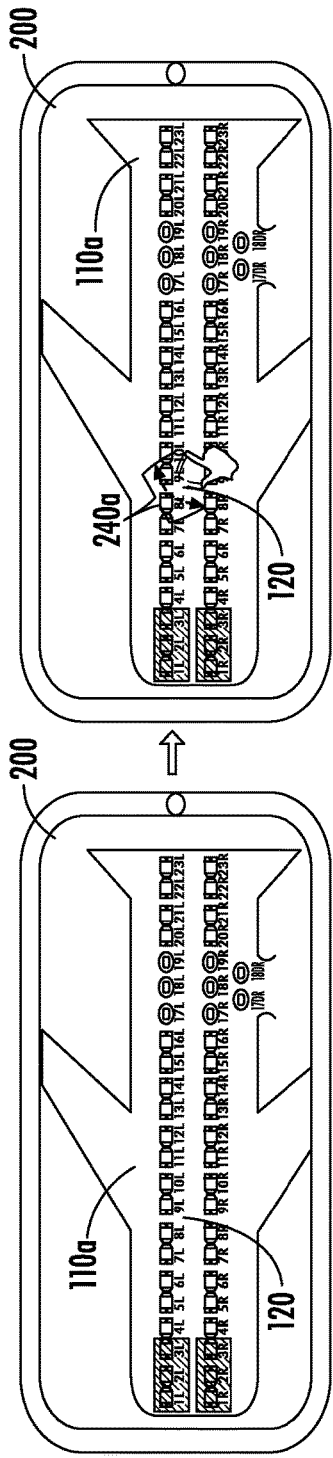
FIG. 14A
FIG. 14B
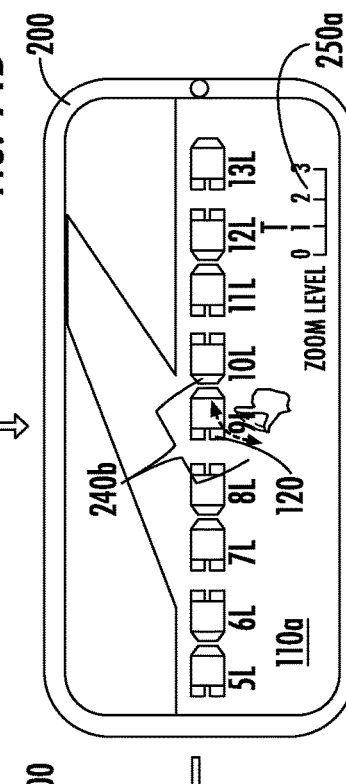
FIG. 14C
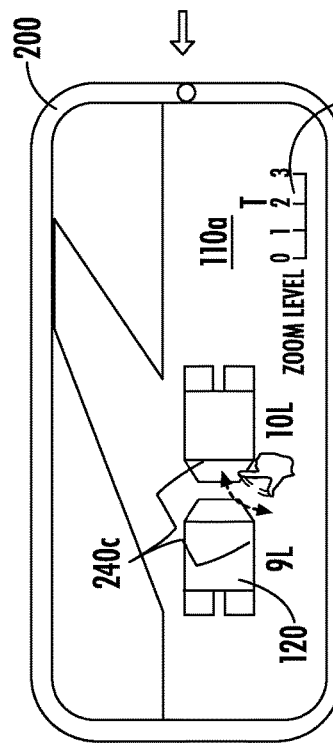
FIG. 14D
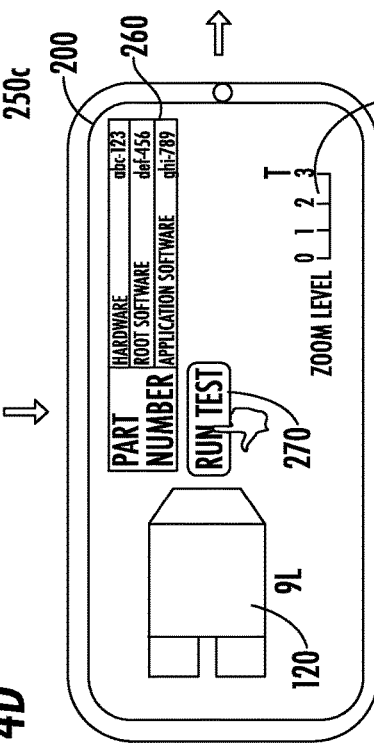
FIG. 14E
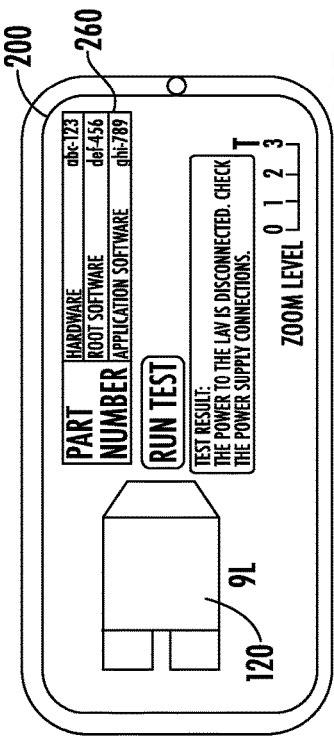
FIG. 14F

METHOD OF HANDLING AIRCRAFT CARGO FROM A PORTABLE PANEL

CROSS-REFERENCE TO RELATED APPLICATION

This application claims the benefit of Indian Patent Application No. 201911019411 filed May 15, 2019, which is incorporated herein by reference in its entirety.

BACKGROUND

The disclosed embodiments relate to a cargo handling system (CHS) and more specifically to a CHS with a portable cargo panel (PCP).

Cargo handling systems for aircraft help move cargo through an aircraft fuselage. In current aircraft cargo handling systems, loading and unloading of cargo holding Unit Load Devices (ULDs) in various cargo compartments is controlled through various fixed wall mounted local control panels distributed about the aircraft and one or more master control panels and master display units.

SUMMARY OF THE INVENTION

Disclosed is a method of operating a Portable Cargo Panel (PCP) for an aircraft, comprising: detecting a gesture on a display of the PCP; determining that the gesture is a command to view on the display a first cargo compartment, the first cargo compartment including a doorway, a first plurality of Cargo Handling Units (CHUs), and a first control panel operationally connected to the plurality of CHUs; securing a wireless connection with the first control panel; receiving, from the first control panel, a health state of each the plurality of CHUs; displaying, on the display, the first cargo compartment with the plurality of CHUs and the operational state of the plurality of CHUs; controlling one or more of the CHUs in the first cargo compartment by transmitting, to the first control panel, a command to: run a diagnostic test against the one or more of the plurality of CHUs; or control the plurality of CHUs to move a Unit Load Device (ULD) into, within or out of the first cargo compartment.

In addition to one or more of the above disclosed features, or as an alternate, the method includes distinguishing on the display between: any CHU of the plurality of CHUs that is a Power Drive Unit (PDUs); and any CHU of the plurality of CHUs that is a Turntable Unit (TUs).

In addition to one or more of the above disclosed features, or as an alternate, the method includes periodically requesting, from the first control panel, health state updates for the plurality of CHUs in the first cargo compartment; and updating the display when changes in the health state of the plurality of CHUs is detected; wherein the operational state for the plurality of CHUs includes one or more of: operating normally; and malfunctioning.

In addition to one or more of the above disclosed features, or as an alternate, the method includes detecting a second gesture on the display; determining that the second gesture is a command for moving a first ULD along a first transport path that is a linear path into, within, or out of the first cargo compartment; determining whether the first transport path is valid; when the first transport path is valid, forwarding a command to move the first ULD along the first transport path to the first control panel, whereby the first control panel commands the plurality of CHUs to move the ULD along the first transport path; and when the first transport path is invalid, displaying an error message.

In addition to one or more of the above disclosed features, or as an alternate, the method includes obtaining operational state updates for the plurality of CHUs from first control panel while the CHUs are moving the first ULD along the first transport path; displaying the operational states for the plurality of CHUs while the CHUs are moving the first ULD along the first transport path; wherein the operational states include: running; and standby.

In addition to one or more of the above disclosed features, or as an alternate, the method includes obtaining a position of the first ULD from first control panel while the CHUs are moving the first ULD along the first transport path; and displaying the position of the first ULD while the CHUs are moving the first ULD along the first transport path.

In addition to one or more of the above disclosed features, or as an alternate, the method includes determining that the first transport path is invalid when: another ULD is located along the first transport path; or the plurality of CHUs located along the first transport path are unable to execute one or more movements of the ULD along the first transport path.

In addition to one or more of the above disclosed features, or as an alternate, the method includes displaying a phantom image of the ULD moving along the first transport path before transmitting to the first control panel a command to move the ULD along the first transport path.

In addition to one or more of the above disclosed features, or as an alternate, the method includes detecting a third gesture on the display; determining that the third gesture is a command for rotating a ULD by ninety degrees and linearly moving the ULD along a second transport path that is into, within, or out of the first cargo compartment; determining whether the second transport path is valid; when the second transport path is valid, forwarding a command to move the ULD along the second transport path to the first control panel, whereby the first control panel commands the plurality of CHUs to move the ULD along the second transport path; and when the second transport path is invalid, displaying an error message.

In addition to one or more of the above disclosed features, or as an alternate, the method includes obtaining operational state updates for the plurality of CHUs from first control panel while the CHUs are moving the first ULD along the second transport path; displaying the operational states for the plurality of CHUs while the CHUs are moving the first ULD along the second transport path; wherein the operational states include: running; and standby.

In addition to one or more of the above disclosed features, or as an alternate, the method includes obtaining a position of the first ULD from first control panel while the CHUs are moving the first ULD along the second transport path; and displaying the position of the first ULD while the CHUs are moving the first ULD along the second transport path.

In addition to one or more of the above disclosed features, or as an alternate, the method includes determining that the second transport path is invalid when: the first cargo compartment is configured without TUs to thereby prevent movement of the ULD along the second transport path; or another ULD is located along the second transport path; or the plurality of CHUs located along the second transport path are unable to execute one or more movements of the ULD along the second transport path.

In addition to one or more of the above disclosed features, or as an alternate, the method includes displaying a phantom image of the ULD moving along the second transport path before transmitting to the first control panel a command to move the ULD along the second transport path.

In addition to one or more of the above disclosed features, or as an alternate, the method includes detecting a fourth gesture on the display; determining the fourth gesture is a zoom-in gesture; determining that a next zoom-in level is a maximum zoom-in level; and determining that one of the plurality of CHUs proximate a zoom-in gesture is in a malfunctioning state; and updating the display to illustrate: the one of the plurality of CHUs that is malfunctioning; and maintenance data for the one of the first plurality CHUs that is malfunctioning.

In addition to one or more of the above disclosed features, or as an alternate, the method includes displaying a query of whether to instruct the first control panel to run a diagnostic test on the one of the plurality of CHUs that is malfunctioning.

In addition to one or more of the above disclosed features, or as an alternate, the method includes receiving a command to instruct the first control panel to run the diagnostic test on the one of the plurality of CHUs that is malfunctioning; instructing the first control panel to run the diagnostic test on the one of the plurality of CHUs that is malfunctioning; receiving results of the diagnostic test from the first control panel; and displaying the results of the diagnostic test including a suggestion for resolving any error detected by the diagnostic test.

In addition to one or more of the above disclosed features, or as an alternate, the method includes detecting a fifth gesture on the display; determining the fifth gesture is a zoom-in gesture; determining that a next zoom-in level is a maximum zoom-in level; determining that two CHUs of the plurality of CHUs are proximate the zoom gesture; determining that neither the two CHUs is in a malfunctioning state; determining that one of the two CHUs is closer to the zoom gesture than another of the two CHUs; and updating the display to illustrate: the one of the two CHUs that is closer to the zoom gesture than another of the two CHUs; and maintenance data for the one of two CHUs.

In addition to one or more of the above disclosed features, or as an alternate, the method includes displaying a query of whether to instruct the control panel to run a diagnostic test on the one of the plurality of CHUs.

Further disclosed is a portable cargo panel (PCP) configured to execute one or more features of the above disclosed method.

Further disclosed is an aircraft system comprising: a first cargo compartment; the first cargo compartment including a first doorway, a plurality of Cargo Handling Units (CHUs) and a first control panel operationally connected to the plurality of CHUs; and a portable cargo panel (PCP) configured to wirelessly communicate with the first control panel and execute one or more features of the above disclosed method.

BRIEF DESCRIPTION OF THE DRAWINGS

The following descriptions should not be considered limiting in any way. With reference to the accompanying drawings, like elements are numbered alike:

FIGS. 6a-6f show a PCP receiving a command to move a Unit Load Device (ULD) into the first compartment and movement of the ULD into the first compartment according to an embodiment;

FIGS. 8a-8c show a PCP receiving a command to move a ULD within the first compartment and movement of the ULD within the first compartment according to an embodiment;

FIGS. 10a-10b show the PCP receiving an invalid command to load a ULD into the first compartment and responding with an error message according to an embodiment;

FIGS. 11a-11b show the PCP receiving an invalid command to move a ULD longitudinally within the first compartment and responding with an error message according to an embodiment;

FIGS. 12a-12b show the PCP receiving an invalid command to move a ULD transversely within the first compartment and responding with an error message according to an embodiment;

FIGS. 14a-14f show a process for zooming-in to obtain a magnified image and a state of a malfunctioning CHU and executing a diagnostic test for the malfunctioning CHU according to an embodiment;

DETAILED DESCRIPTION

A detailed description of one or more embodiments of the disclosed apparatus and method are presented herein by way of exemplification and not limitation with reference to the Figures.

Figure 1:
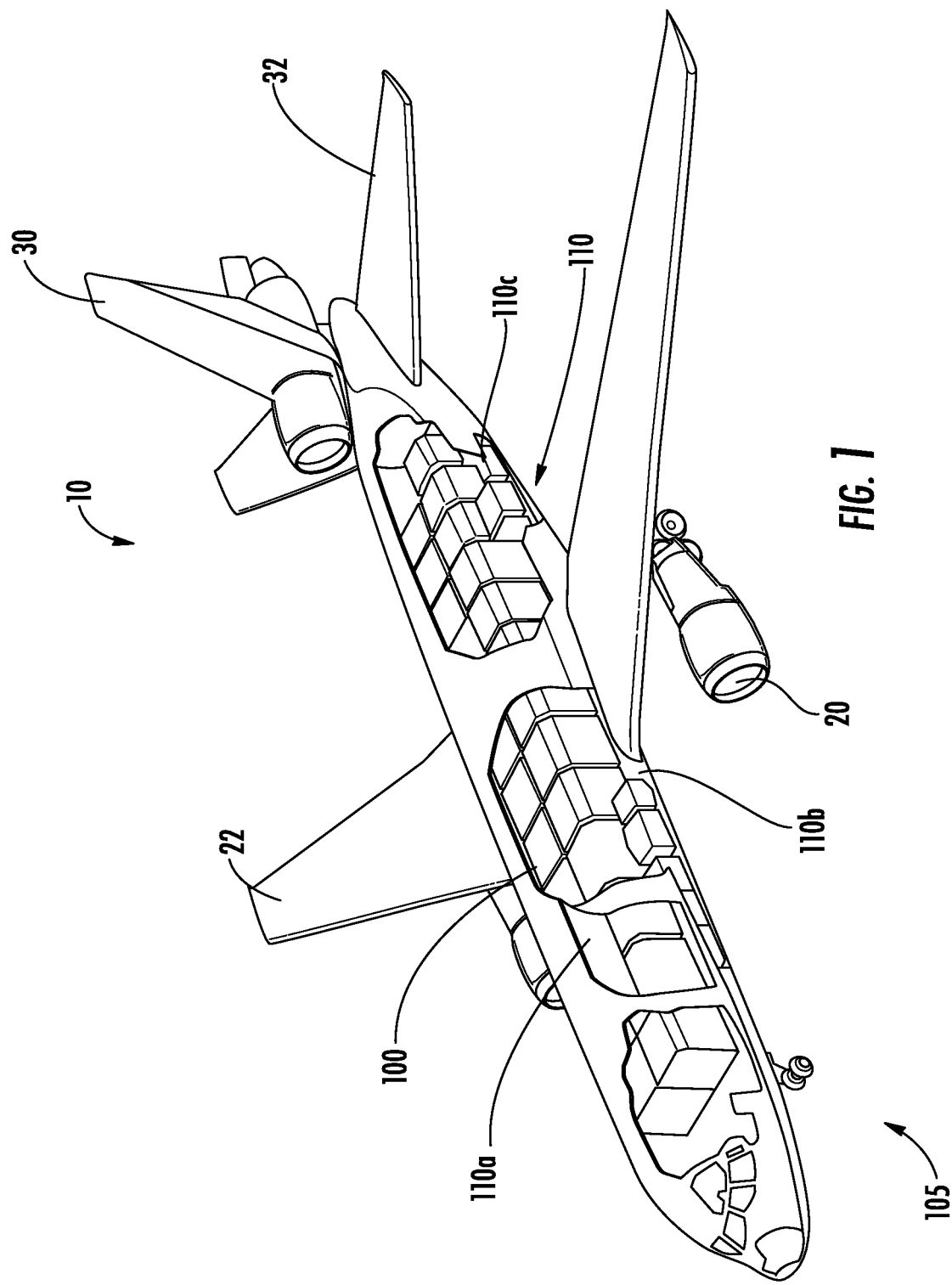
FIG. 1 is a perspective view of an aircraft where embodiments of the present invention can be implemented.

FIG. 1 illustrates an example of a commercial aircraft 10 having aircraft engines surrounded by (or otherwise carried in) a nacelles 20. The aircraft 10 includes two wings 22, a horizontal stabilizer 32 and vertical stabilizer 30. The aircraft 10 includes a cargo handling system (CHS) 105 that includes a plurality of Cargo Storing Compartments (CSC) 110 including a first compartment 110a which may be a primary compartment on a main cargo deck, a second compartment 110b which may be secondary compartment, for example a forward lower lobe compartment in the aircraft 10. A third compartment 110c may be an aft lower lobe compartment. Cargo to be shipped via aircraft are first loaded onto Unit Load Devices (ULDs) 100. The ULDs 100 are pallets or containers configured with controllers for providing electronic communications including for example identifying information and location information.

Figure 2B:
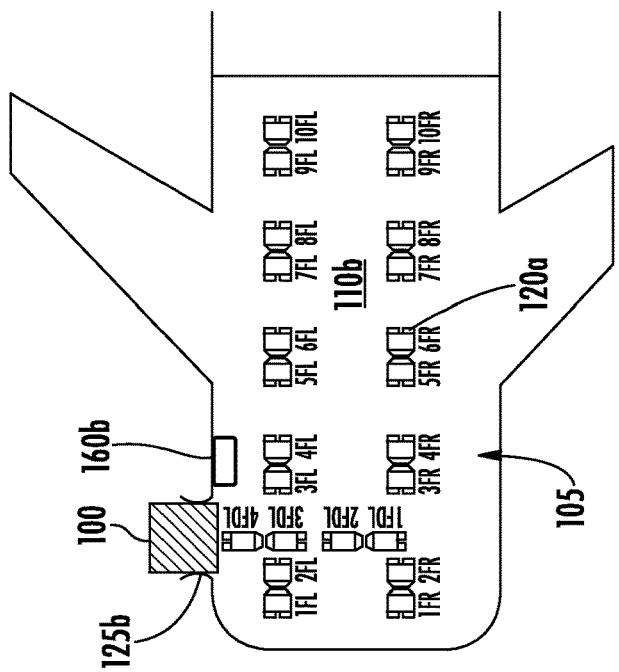
FIGS. 2a-2b show cargo compartments in the aircraft where embodiments of the present invention can be implemented.
Figure 2A:
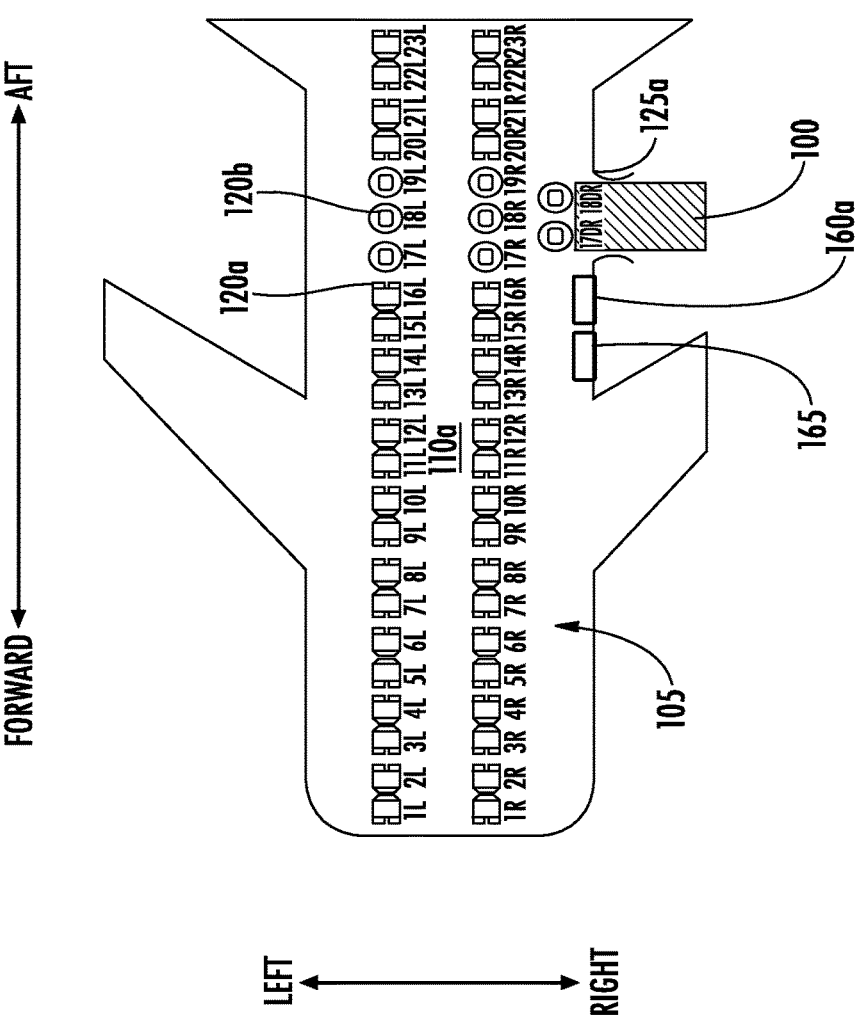

Turning to FIGS. 2a and 2b, once a ULD 100 is loaded with cargo, the ULD 100 is loaded into the cargo compartments 110 in an aircraft by a Cargo Handling System (CHS) 105 into one of a plurality of cargo compartments 110 (compartments). The CHS 105 also includes Cargo Handling Units (CHU) 120 in the compartments 110. The CHUs 120 include several discrete elements such as Power Drive Units (PDUs) 120a and Turntable Units (TUs) 120b. The PDUs and TUs are typically Line Replaceable Units (LRUs). The CHUs 120 can collectively move cargo within the compartments 110 to various locations within the compartments. The movement can also be through one or both of a first doorway 125a in the first compartment 110a and a second doorway 125b in the second compartment 110b.

The CHUs 120 are disposed along transversely spaced left and right sections of the compartments 110, and are distributed between longitudinally spaced forward and aft ends of the compartments 110. The CHUs 120 include Power Drive Units (PDUs) 120a in each of the compartments 110 in one embodiment. The TUs 120b can be in the first compartment 110a in proximate with the first doorway 125a as illustrated or in other locations as needed. Depending on placement of the PDUs 120a, the PDUs 120a drive ULDs 100 linearly, longitudinally or transversely, within the compartments 110. The TUs 120b provide for rotation in opposing direction and for both longitudinal and transverse linear motion of ULDs 100 within the first compartment 110. As illustrated, the first compartment 110a has both PDUs 120a and TUs 120b. The second compartment 110b and third compartment may have only PDUs 120b. Operations in the third compartment 110c may be the same as the operation in second compartment 110b so that further illustration of the third compartment is omitted.

A plurality of control panels 160, including a first control panel 160a and a second control panel 160b, are respectively disposed at the compartments 110a, 110b to control operation of the CHUs 120 in the respective compartments 110. The first panel 160a may be a master panel and the second panel 160b may be a local panel which may be controlled by the master panel 160a. The control panels 160 may communicate with a Cargo Maintenance Display Unit (CMDU) 165 located with the master panel 160a to enable visual monitoring of the control panels 160 and the CHUs 120. The control panels 160 may communicate with other control panels 160 and CHUs 120 either via wired communication bus like ARINC (Aeronautical Radio, Incorporated) 429, ARINC 629, and CAN (Controller Area Network), etc., or via wireless communication interface like Wi-Fi, Bluetooth and WAIC (Wireless Avionics Intra-Communication), etc.

Challenges with the use of the various prior art control panels 160 may include inefficiently tracking and controlling a distribution of ULDs 100 in the compartments 110. There may also be challenges with respect to efficiently identifying operational and health issues associated with the CHUs 120 within the compartments 110.

Figure 3:
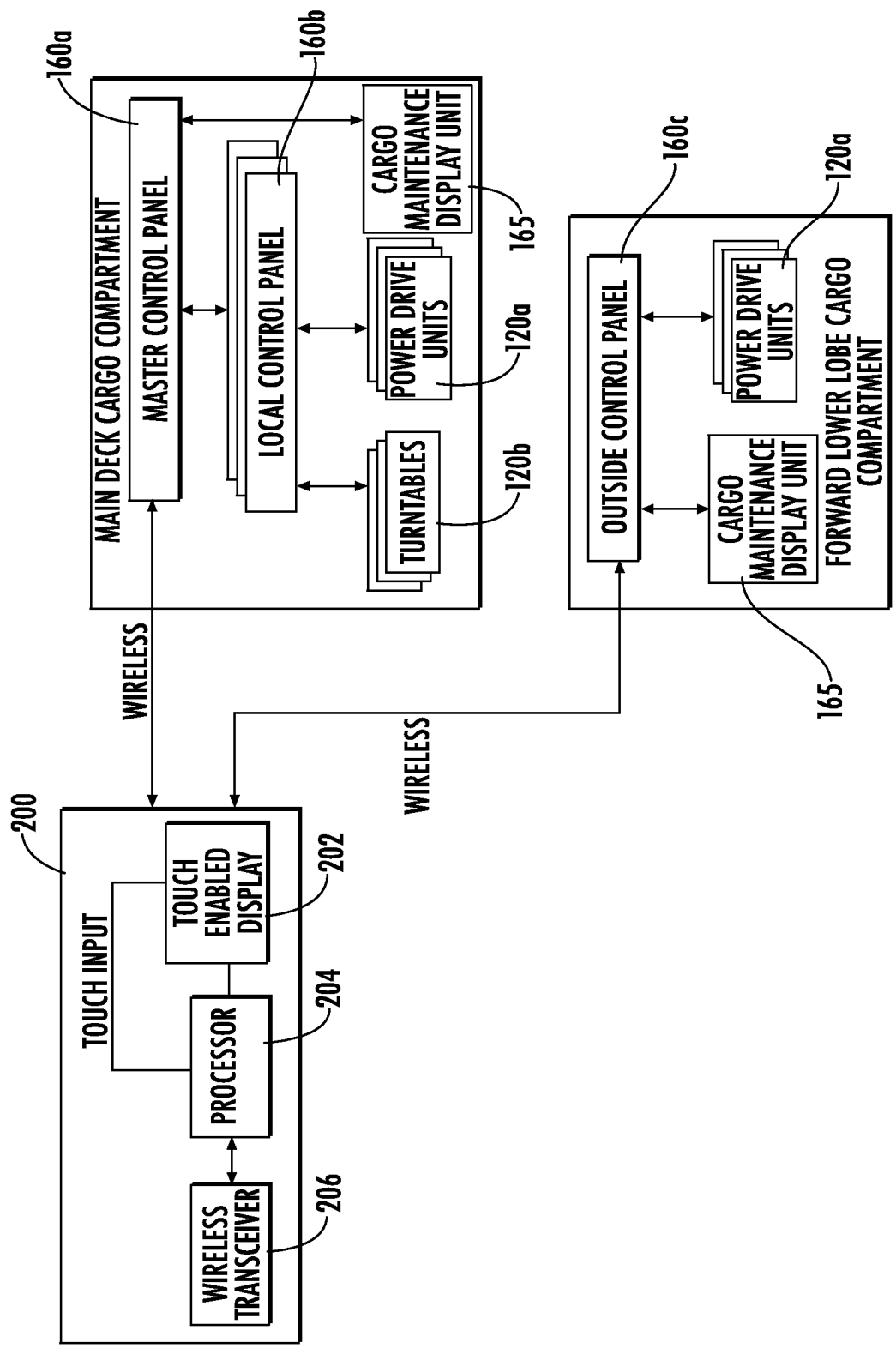
FIG. 3 shows a high-level architecture of a Cargo Handling System (CHS) interfacing with a Portable Cargo Panel (PCP) according to an embodiment.

In view of such challenges, FIG. 3 illustrates a Portable Cargo Panel (PCP) 200, which is a portable electronic device having a touch screen (display) 202, a processor 204 and a wireless transceiver 206. The PCP 200 remotely controls the CHUs 120 to allow for loading and unloading ULDs 100 from the cargo compartments 110 and to manipulate ULDs 100 within the cargo compartments 110. The disclosed PCP 200 includes but is not limited to tablet computing devices, mobile phones, etc. The PCP 200 provides real-time interfacing with the CHS 105 to provide functionalities including tracking of ULDs and monitoring of operational and health states of the CHUs 120 within each of the compartments 110.

The PCP 200 may support recognition of a plurality of gestures including single-touch gestures and multi-touch gestures as further disclosed below. The PCP 200 may recognize gestures as commands to execute cargo handling operations and the PCP 200 may forward the commands to the control panels 160 for execution in the compartments 110 by the CHUs 120. In one embodiment, the PCP 200 communicates with the second control panel 160b via the first control panel 160a. In additional or alternatively, the PCP 200 directly communicates with each of the control panels 160.

Figure 4:
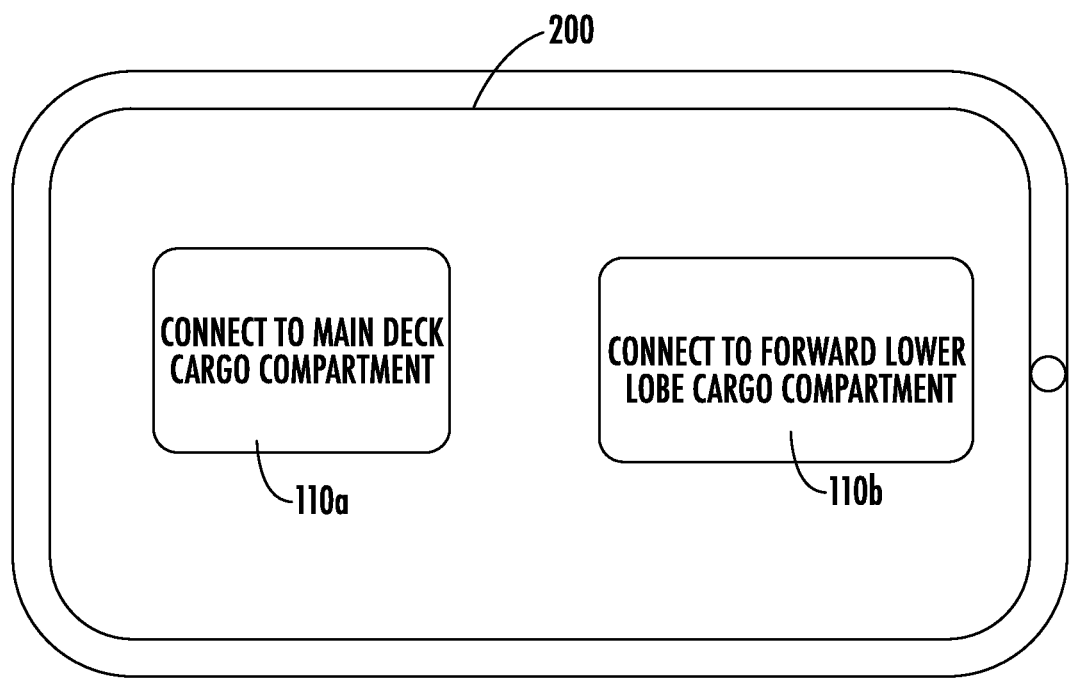
FIG. 4 shows of a PCP display at power up change as below according to an embodiment.

FIG. 4 shows an example of a display of the PCP 200 during power-up state. At power-up, there is an option for an operator to connect to the compartments 110. Other compartments 110 may be within an aircraft though not illustrated here.

Figure 5A:
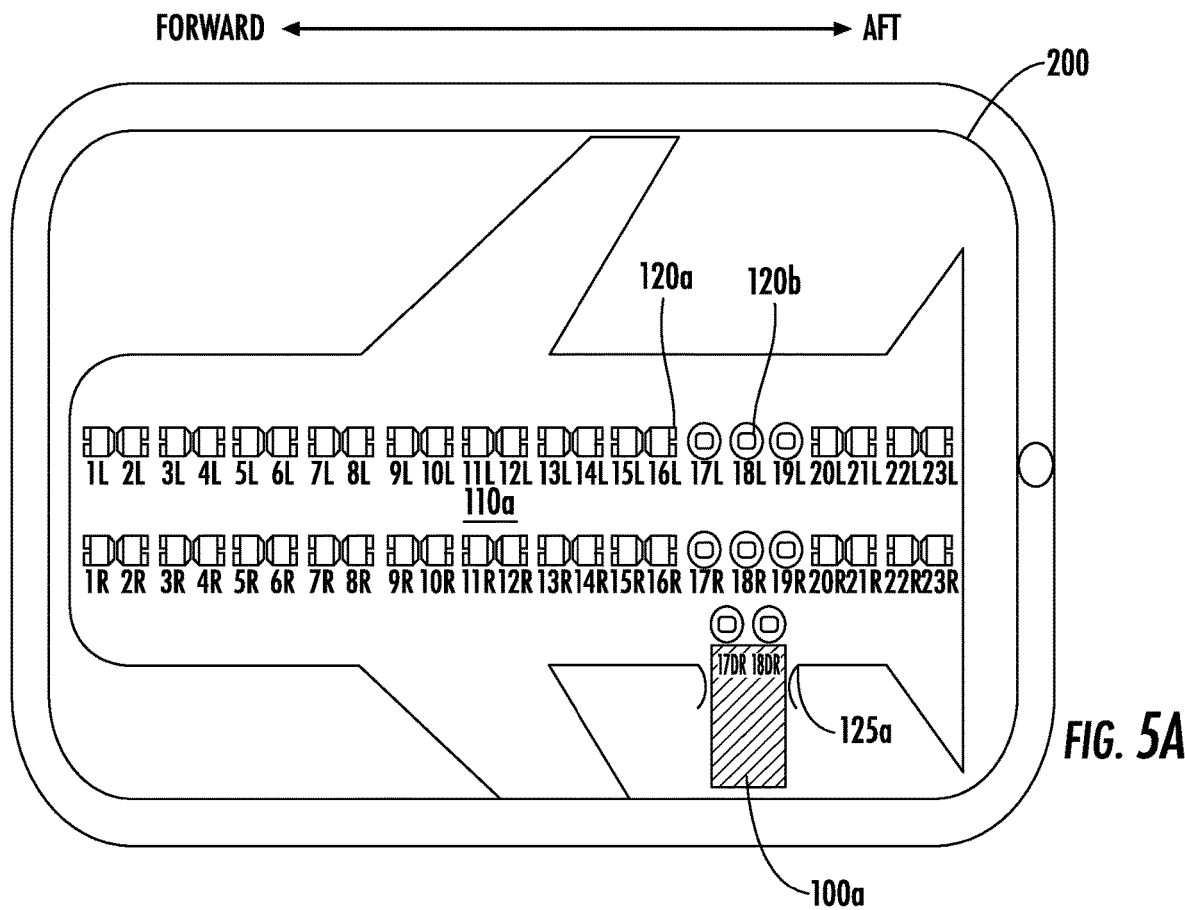
FIGS. 5a-5b show a first compartment display on a PCP and a second compartment display on a PCP according to an embodiment.
Figure 5B:
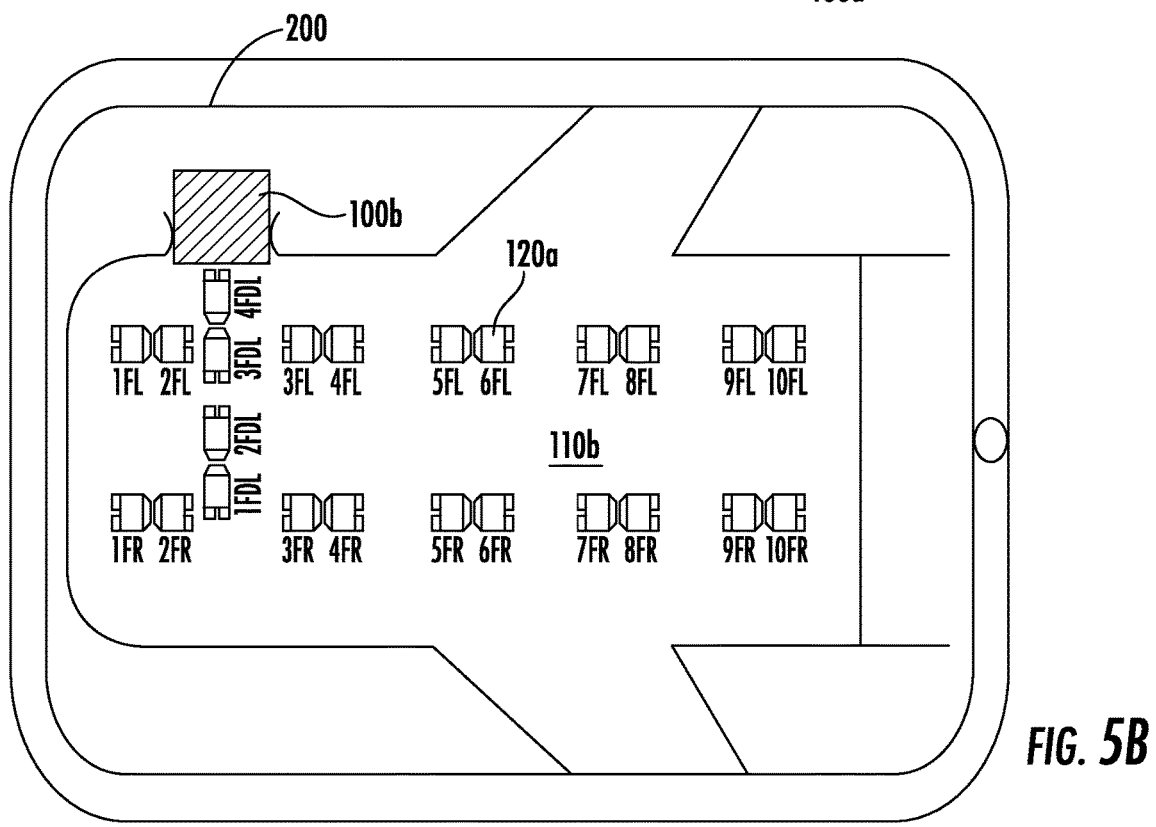

FIG. 5a shows the display of the PCP 200 after connecting to the first control panel 160a. Such connection is obtained following an operator has engaged the PCP 200 and provided an input command, via an input gesture, to connect to the first control panel 160a. Similarly, FIG. 5b shows the display on the PCP 200 after connecting to the second control panel 160b. The display shows the health state of the ULDs 100 and CHUs 120 inside the compartments 110. For example, the first compartment 110a has a first ULD 100a disposed at the first doorway 125a. The second compartment 110b has a second ULD 100b disposed at the second doorway 125b. The illustrated health state indicates that all of the CHUs 120 is normal, indicating that maintenance is not required. The health state may be shown by a shading, marking or symbols on the CHUs 120 which differentiate those having a normal health state from those that are malfunctioning, which includes but is not limited to a failing state. In the disclose embodiments, malfunctioning CHUs 120 are differentiated from those have having a normal health state by shading, as discussed in greater detail below (FIG. 14).

As illustrated and not by way of limitation, the first compartment 110a includes twenty-three CHUs 120 in each of the left and right segments of the first compartment 110a. From forward to aft, the twenty-three CHUs 120 include sixteen PDUs 120a that are forward of the first doorway 125a, followed by three TUs 120b that are aligned with the first doorway 125a, followed by another three PDUs 120a that are aft of the first doorway 125a. The CHUs 120 in the right section are identified forward to aft as units 1R-23R, where "R" represents the right section. The CHUs 120 in the left section are identified forward to aft as units 1L-23L, where "L" represents the left section. An addition two doorway TUs 120b, identified as units 17DR and 18DR, where "D" represents doorway, may be disposed transversely between units R17-R19 and the first doorway 125a, to receive ULDs 100 moved into and out of the first compartment 110a.

Again, as illustrated and not by way of limitation the second compartment 110b includes ten CHUs 120, each of which are PDUs 120a, in each of the left section and the right section. The CHUs 120 in the left section may be identified forward to aft as units 1FL-10FL, where "F" represents "forward compartment". The CHUs 120 in the right section may be identified forward to aft as unit 1FR-10FR. An additional four doorway CHUs 120, identified as unit 3FDR-4FDR and unit 3FDL-4FDL, may be arranged transversely, extending from the second doorway through the left section and ending at the right section, to receive cargo being moved into and out of the second compartment.

Turning to FIGS. 6a-6f, movement of the first ULD 100a in the first compartment 110a will be addressed in further detail. In FIG. 6a the PCP 200 receives a first touch gesture, which is a single point of contact that traces an arc to define a first transport path 210a starting at the first ULD 100a at the first doorway 125a and ending at unit 15R of CHU 120. The PCP 200 displays a first phantom image 220a of the first ULD 100, which is rotated ninety degrees and positioned over units 13R-15R of the CHUs 120. The first phantom image 220a provides a visual confirmation to the operator of the first transport path 210a. Movement along the first transport path 210a requires a combination of movements, otherwise referred to as a complex movement, illustrated in FIGS. 6b-6f, and described below. During or proximate to this time, the PCP 200 also determines that movement of the first ULD 100a along the first transport path 210a is valid by a process discussed in greater detail below.

The PCP 200 transmits a command to the first control panel 160a to control the CHUs 120 to move the first ULD 100a along the first transport path 210a. The first control panel 160a in turn controls the CHUs 120 in the first compartment 110a to move the first ULD 100a along the first transport path 210a. During this time, the PCP 200 communicates with the first control panel 160a to receive operational state updates for the CHUs 120 that are moving the ULD 100a along the first transport path 210a and to receive updates positional location updates for the ULD 100a. An operational state of the CHUs 120 may be running or standby. The different operational states of the CHUs 120 may be visually displayed by the PCP 200, along with an updated location of the ULD 100a, as disclosed in greater below and in FIGS. 6b-6f.

FIG. 6b is a view of the PCP 200 illustrating linear movement of the first ULD 100a with units 17DR and 18DR of the CHUs 120, which are TUs 120b, for transversely moving the first ULD 100a from the first doorway 125a and into the first compartment 110a. Units 17DR and 18DR of the CHUs 120 are illustrated as straight arrows pointing transversely across the first compartment 110a in the direction of linear motion. The arrow graphic represents the running state of units 17DR and 18DR of the CHUs 120. In this figure, and in each other figure, the remaining CHUs 120 that are not in a running state, but are instead in a standby state, are illustrated in a component graphic. That is, the component graphic for the CHUs 120s is either a PDU 120a or a TU 120b.

FIG. 6c is a view of the PCP 200 illustrating units 17DR-18DR of the CHUs as still moving first ULD 100a in the transverse direction, and units 17R-19R of the CHUs 120, which are also TUs, as engaging in rotational motion. The running state of units 17DR-18DR of the CHUs 120 is illustrated by transversely directed arrows pointed in the direction of linear motion and the running state of units 17R-19R of the CHUs 120 is illustrated by arc shaped arrows pointed in the direction of rotation. The remaining CHUs 120 are in the standby state and are illustrated as components. The combined motion of the CHUs 120 in FIG. 6c move the first ULD 100a away from the first doorway 125a and initiate rotation of the ULD 100a to align with the right section of the CHUs 120 in the first compartment 110a.

FIG. 6d is a view of the PCP 200 illustrating rotational movement of the first ULD 100a by the units 17DR-18DR and units 17R-19R of the CHUs 120. The running state of units 17DR-18DR and units 17R-19R of the CHUs 120 is illustrated by arc shaped arrows pointed in the direction of rotation. The remaining CHUs 120 are in the standby state and are illustrated as components. During this operation the first ULD 100a is turned ninety degrees from its orientation at the first doorway 125a. This provides for proper alignment of the first ULD 100a along the right section of the first compartment 110a.

FIG. 6e illustrates linear advancement of the first ULD 100a on units 13R-19R of the CHUs 120, where units 13R-16R are PDUs and units 17R-19R are TUs. The running state of units 13R-19R is illustrated as arrows in the direction of linear motion. The remaining CHUs 120 are in standby mode and illustrated in a component graphic. The arrows in FIG. 6e are bold compared with arrows in FIG. 6b to differentiate longitudinal motion within the first compartment 110a and transverse motion into or out of the first compartment 110a. FIG. 6f illustrates the first ULD 100a situated over units 13R-15R of the CHUs 120 in the first compartment 110a, with all CHUs 120 in a standby state.

Figure 7:
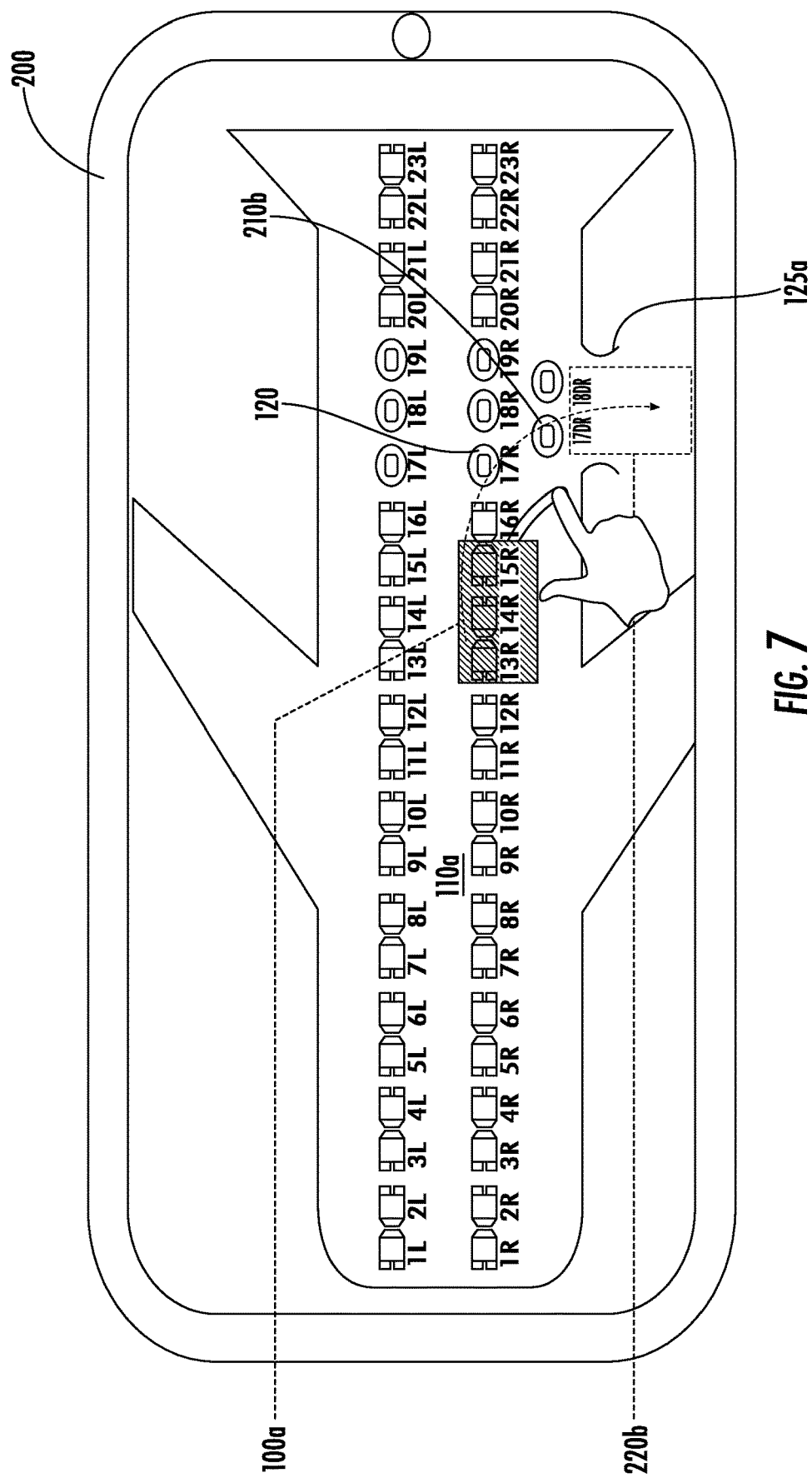
FIG. 7 shows a PCP receiving a command to move a ULD out of the first compartment according to an embodiment.

It is to be appreciated that moving the first ULD 100a out of the first compartment 110a from units 13R-15R of the CHUs 120 requires the reverse order of operations for the CHUs 120 as illustrated in FIGS. 6b-6f. For example, as illustrated in FIG. 7, the PCP 200 receives a second touch gesture, which is an arc tracing a second transport path 210b starting at the first ULD 100a and ending at the first doorway 125a. In response, the PCP 200 illustrates in a second phantom image 220b of the first ULD 100a passing through the first doorway 125a. If the second transport path 220b is valid, the PCP 200 will transmit a command to the first control panel 160a to move the first ULD 100a. As indicated, the remaining order of operations for removing the ULD 100a from the first compartment 110a are the reverse of those illustrated in FIGS. 6b-6f.

FIGS. 8a-8c show the display of the PCP 200, where the PCP 200 receives input to move the first ULD 100a linearly in a longitudinal direction within the first compartment 110a. In FIG. 8a, the PCP 200 receives a third touch gesture, which is linear or drag gesture, which is a single point of contact that traces a line and defines a third transport path 210c extending from units 3L-5L to units 9L-11L of the CHUs 120. A third phantom image 220c of the first ULD 100a is graphically moved in FIG. 8a to provide a visual confirmation of the third transport path 210c. Providing the PCP 200 determines that movement along the third transport path 210c is valid, the PCP 200 transmits a command to the first controller 160a to move the first ULD 100a along the third transport path 210c. In turn, the first controller 160a will control the CHUs 120 to move the first ULD 100a along the third transport path 210c. The PCP 200 maintains communication with the first controller 160a to monitor operational states of the CHUs 120 while the first ULD 100a is moved along the third transport path 210a. FIG. 8b illustrates linear advancement of the first ULD 100a, as illustrated by the PCP 200, by operation of each of units 3L-11L of the CHUs 120. The running state of units 3L-11L of the CHUs 120 are illustrated as straight arrows pointing in the direction of linear motion. The remaining CHUs 120 remain in the standby state and are illustrated with component images. FIG. 8c illustrates the first ULD 100a at units 9L-11L of the CHUs 120, with all CHUs 120 in a standby state.

Figure 9:
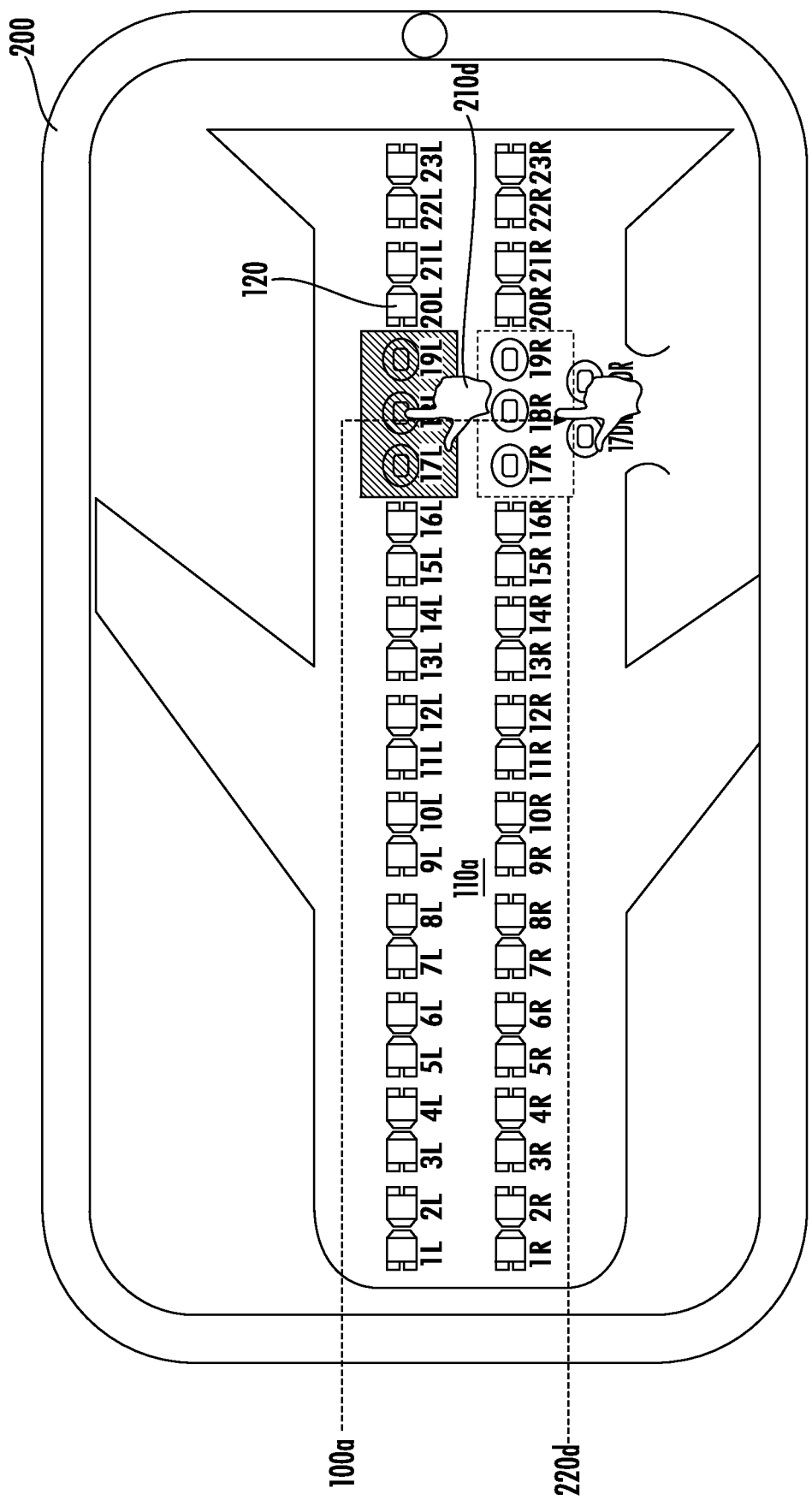
FIG. 9 shows a PCP receiving a command to move a ULD within the first compartment according to an embodiment.

It is to be appreciated that transversely moving the first ULD 100a in the first compartment 110a requires a similar order of operation for the CHUs 120 as illustrated in FIGS. 8b-8c. As illustrated in FIG. 9, for example, the PCP 200 receives another linear or drag gesture, defining a fourth transport path 210d extending from units 17R-19R to units 17L-19L of the CHUs 120. A fourth phantom image 220d of the first ULD 100a is graphically moved in FIG. 9 to provide a visual confirmation of the fourth transport path 210d. Providing the fourth transport path 210d is valid, the PCP 200 will forward a command to the first control panel 160a to instruct the CHUs 120 to move the first ULD 100a along the fourth transport path 210d. In this instance, action of the CHUs 120 would move the first ULD 100a from units 17R-19R to units 17L-19L of the CHUs 120.

As indicated above, the PCP 200 validates movement along the transport path before the CHUs 120 are instructed to move the first ULD 100a by the first controller 160a. FIG. 10a shows the PCP 200 receiving a further gesture defining a further transport path 210e indicating a movement of the first ULD 100a from the first doorway 125a into the aft portion of the first cargo compartment 110a, and colliding with a wall of the cargo compartment 110a. Thus, the further transport path 210e is invalid. FIG. 10b illustrates a graphical error warning 230a provided by the PCP 200 in response to the invalid movement command and the warning 230a may identify the cause of the error.

Similarly, FIG. 11a shows the PCP 200 after receiving a further motion gesture that defines a further transport path 210f to move the first ULD 100a from units 1R-4R of the CHUs 120 to an aft location that collides with a third ULD 100c located at units 9R-12R of the CHUs 120. Thus, the further transport path 210f is invalid. FIG. 11b illustrates a graphical error warning 230b provided by the PCP 200 in response to the invalid movement command, and the warning 230b may identify the cause of the error.

Further, FIG. 12a shows the PCP 200 after receiving a further motion gesture defining a further transport path 210g to transversely move the first ULD 100a from units 6L-8L to units 6R-8R of the CHUs 120. The CHUs 120 involved with this motion are PDUs 120a configured to move linearly only in the longitudinal direction. Thus, the further transport path 210g is invalid. FIG. 12b illustrates a graphical error warning 230c provided by the PCP 200 in response to the invalid movement command, and the warning 230c may identify the cause of the error.

Figure 13A:
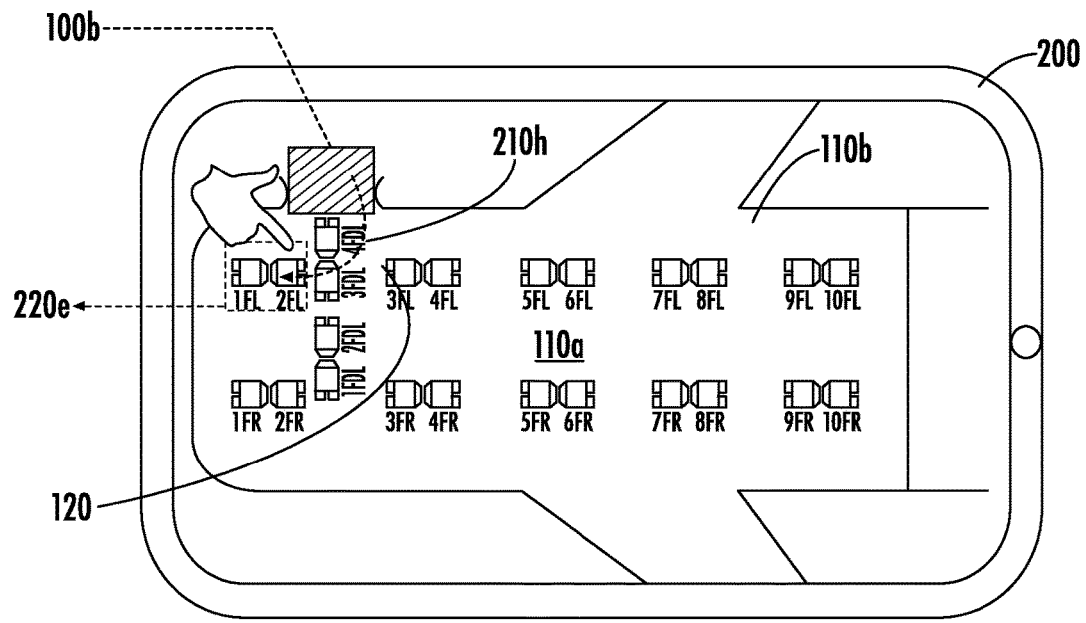
FIGS. 13a-13b shows the PCP receiving an invalid command to load a ULD into the second compartment and responding with an error message according to an embodiment.
Figure 13B:
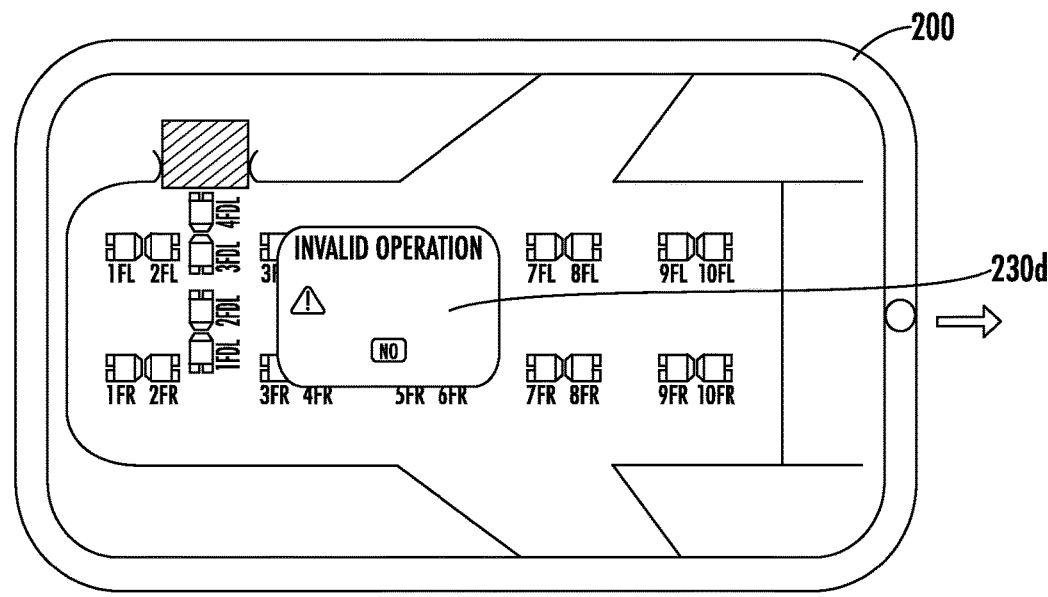

Further, FIG. 13a shows the PCP 200 after receiving a further motion gesture for a further transport path 210h to move the second ULD 100b from second doorway 125b into the second compartment 110b. The PCP 200 provides a further phantom image 220e representing movement of the second ULD 100b along the further transport path 210h. The further transport path 210h is interpreted as requiring rotational motion though TUs 120b are not provided in the second compartment 110b. Thus, the further transport path 210h is invalid. FIG. 13b illustrates a graphical error warning 230d in response to the invalid movement command, and the warning 230d may identify the cause of the error.

As indicated above, the PCP 200 graphically illustrates a health state of the CHUs 120. FIG. 14a shows the display of the PCP 200 illustrating that unit 9L of the CHUs 120 has malfunctioning. The error is provided as a differentiating shade or other visible indicia when compared with CHUs 120 having a normal health state. In FIG. 14b, the PCP 200 receives a zoom-in gesture 240a, which is a two-finger touch gesture, extending in diverging directions over unit 9L of the CHUs 120. FIG. 14c illustrates a zoomed-in version of the first compartment 110a which, at zoom level one (1), includes units 7L-15L of the CHUs 120. The figure includes an indicator 250a of a zoom magnification level, or scale level, which is illustrated at a first magnification level. This enables an operator to determine how many additional zoom levels are available relative to a current view. In the disclosed embodiment, there are four zoom-levels, including levels zero (0) through three (3), where zoom-level zero (0) is the complete view of the first compartment 110a (FIG. 14a).

In FIG. 14c, the PCP 200 receives another zoom-in gesture 240b proximate to unit 11L of the CHUs 120. Unit 9L of the CHUs 120 is proximate the zoom-in gesture 240b and, as indicated, has a malfunctioning health state. Thus, the PCP 200 zooms-in to an area including unit 9L of the CHUs 120. FIG. 14d illustrates a further zoomed-in version of the first compartment 110a which, at zoom level two (2), includes only units 9L and 10L of the CHUs 120. That is, the PCP 200 is biased to zoom-in to CHUs 120 having a malfunctioning health state. The figure includes an indicator 250b of the zoom magnification level, which is illustrated at a second level. In FIG. 14d, the PCP 200 receives a further zoom-in gesture 240c proximate unit 9L of the CHUs 120.

FIG. 14e illustrates a maximum magnified scale illustration, at zoom level three (3), of unit 9L of the CHUs 120 along with identifying maintenance information 260, such as hardware and software versions and part number. The figure includes an indicator 250c of the zoom magnification level, which is illustrated at a third level. A radial button 270 is provided for operational engagement by an operator. Response to operational engagement of the radial button 270, the PCP 200 transmits a command to the first control panel 160a to execute a diagnostic test on unit 9L of the CHUs 120. FIG. 14f illustrates a result of the test displayed over the image of FIG. 14e. In this instance, it is determined that power to PDU 9L is disconnected. The PCP 200 also provides a suggestion for correcting the identified issue, which includes checking the power supply connection.

Figure 15:
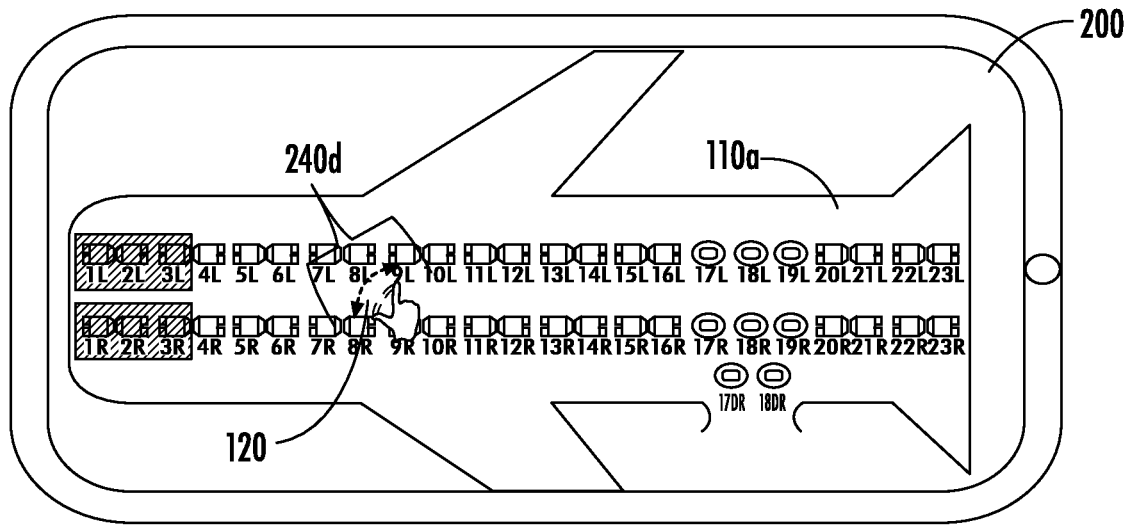
FIG. 15 shows a portion of a process for zooming-in to obtain a magnified image and a health state of a CHU according to an embodiment.

FIG. 15 is analogous to FIG. 14a in that a zoom-in gesture 240d is detected in by the PCP 200. No CHUs 120 in FIG. 15 are identified as having a malfunctioning health state. The process of zooming-in would continue as illustrated with FIGS. 14b-14f except that the PCP 200 would center zoom-in magnifications about a CHU 120 closest to a location of the zoom-in gesture 240a rather than a CHU 120 with a malfunctioning health state. A maintenance test may be performed at zoom magnification level three (3), similar to FIGS. 14e-14f, and the result may be that the CHU 120 has no issues needing attention.

Figure 16:
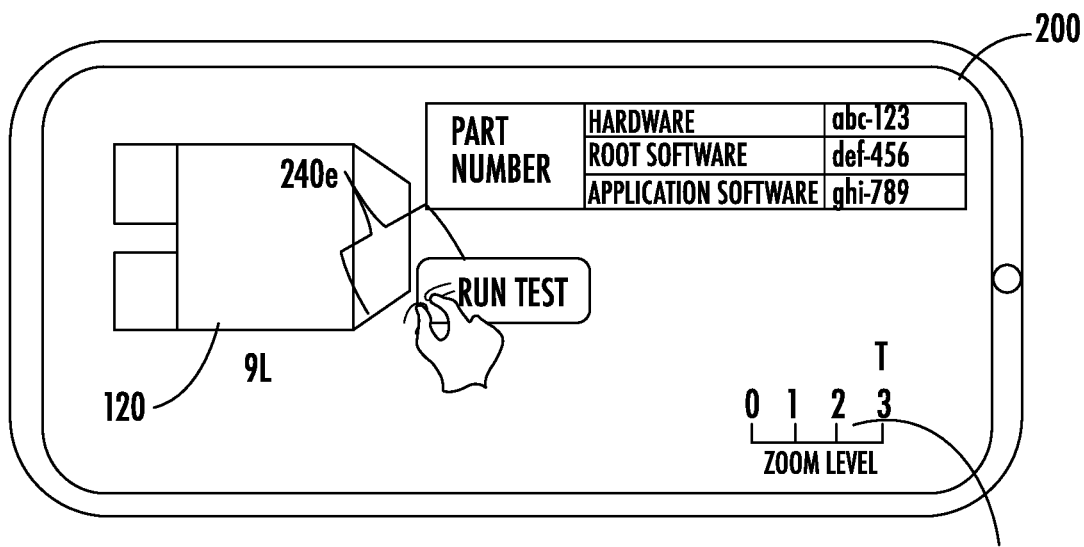
FIG. 16 shows a portion of a process for zooming-out from an image of a CHU that was previously magnified according to an embodiment.

It is to be appreciated that PCP 200 process zoom-out gestures in a reverse order of operation as compared with zoom-in gestures. FIG. 16 illustrates the PCP 200 receiving a zoom-out gesture 240e within a previously zoomed-in display. In FIG. 16, unit 9L of the CHUs 120 is illustrated with a zoom level indicator 250c indicating a level three (3) magnification, which is the maximum zoom level magnification. With each zoom-out gesture, a reverse order of magnification of the images in FIGS. 14b-14f will be displayed. The scale indicator 250c will be provided in all but the maximum zoom-out scale, which corresponds to the image of the complete first cargo compartment 110a (FIG. 14a).

Figure 17A:
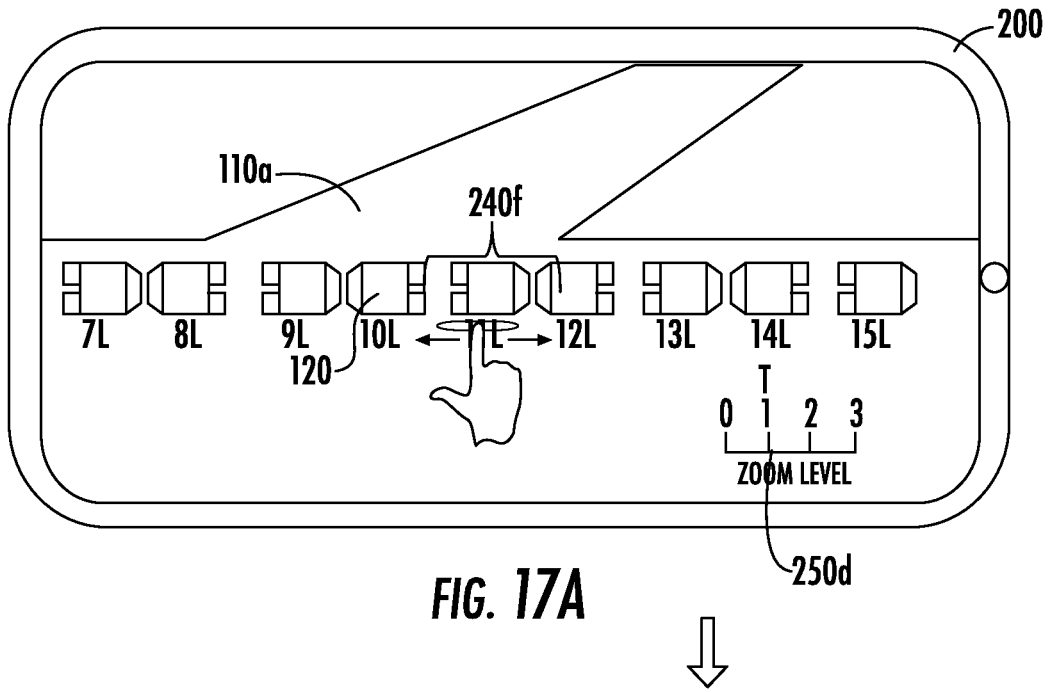
FIGS. 17a-17b shows a portion of a process for providing pan motion to a magnified image.
Figure 17B:
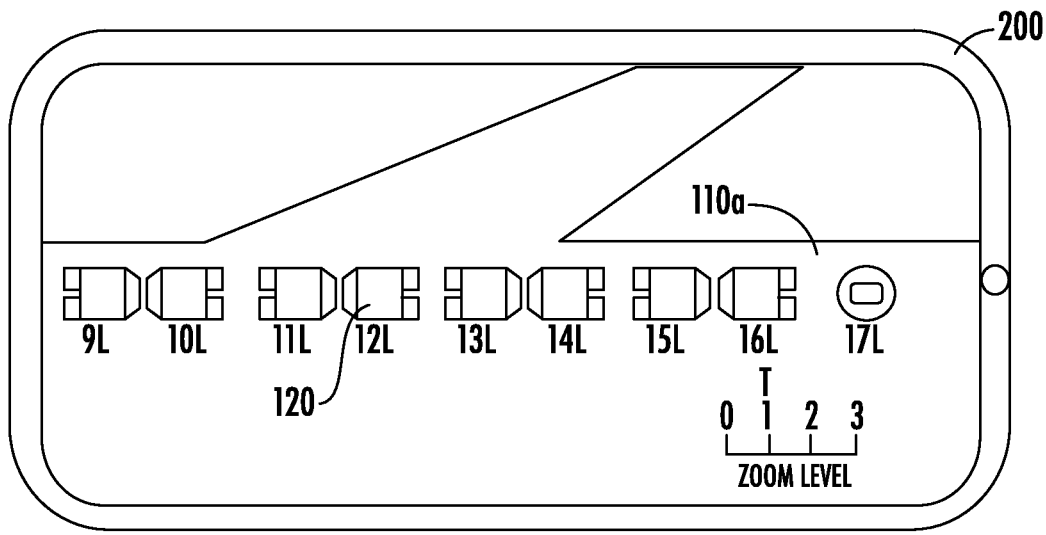

Turning now to FIGS. 17a-17b, when the image on the PCP 200 is zoomed-in by at least one level, a gesture 240f in forward, aft and transverse direction is interpreted as a command to pan the image in the direction of the gesture. In FIG. 17a, such pan gesture 240f is applied to an image having an indicator 250d identifying a first level of zoom magnification. FIG. 17b illustrates a resulting pan motion of the image along the direction of the gesture so that the image of first compartment 110a and the CHUs 120 therein are shifted, in this instance, in the longitudinal direction.

Figure 18:
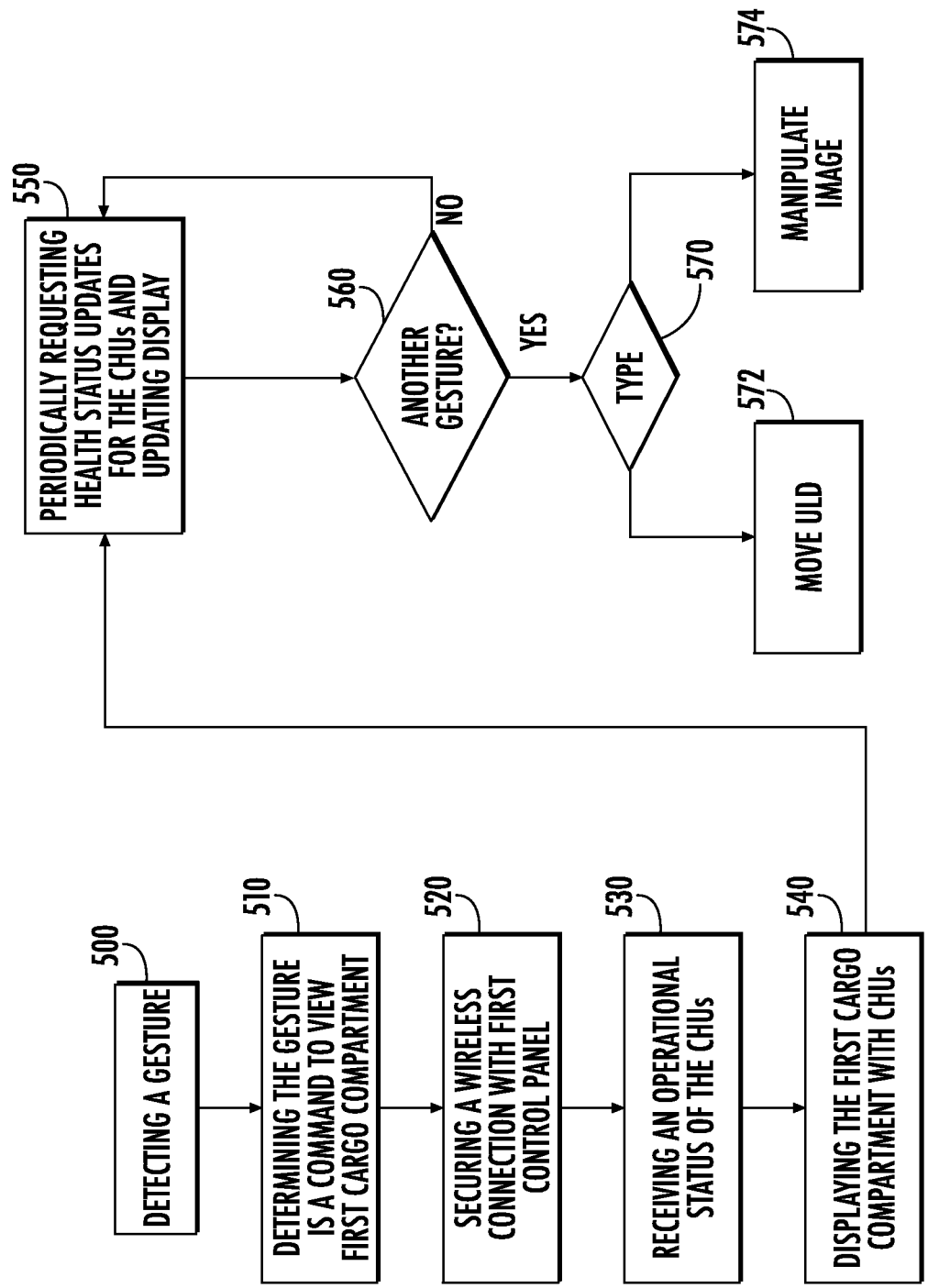
FIG. 18 shows a process of using a PCP at startup according to an embodiment.

Turning to FIG. 18, disclosed is a method of operating the PCP 200. The method includes block 500 of detecting a gesture by the PCP 200, for example via the display, from an operator. The method further includes block 510 of determining that the gesture is a command to view the first compartment 110a.

The method further includes block 520 of securing a wireless connection between the PCP 200 and the first control panel 160a (FIG. 3). The method further includes block 530 of receiving, from the first control panel 160a, a health state of the CHUs 120 in the first compartment 110a. The method further includes block 540 displaying the first cargo compartment 110a with the first doorway 125a, the CHUs 120 distributed therein, and a health state of the CHUs 120 (FIG. 5A). Further, the CHUs 120 are displayed to differentiate between CHUs 120 that are PDUs 120a and TUs 120b (FIG. 5).

The method further includes block 550 of periodically requesting, from the first control panel 160a, health state updates for the CHUs 120 in the first compartment 110a. The method further includes updating the display when changes in health state for the CHUs 120 is detected. For example, the CHUs 120 may have a normal health state or be malfunctioning.

The method includes block 560 of determining whether a second gesture is detected against the display. Block 550 again is executed until the second gesture is detected (NO at block 560). Upon receiving the second gesture (YES at block 560), the method includes block 570 of determining the type of gesture. In one embodiment, the method includes block 572 of determining that the second gesture is a command to move a first ULD 100a into, out of or within the first cargo compartment 110a (FIGS. 6-9). In one embodiment, the method includes block 574 of determining that the second gesture is a command to manipulate the display, e.g., to zoom into or out of the display (FIGS. 14-16) or pan the display (FIG. 17).

Figure 19:
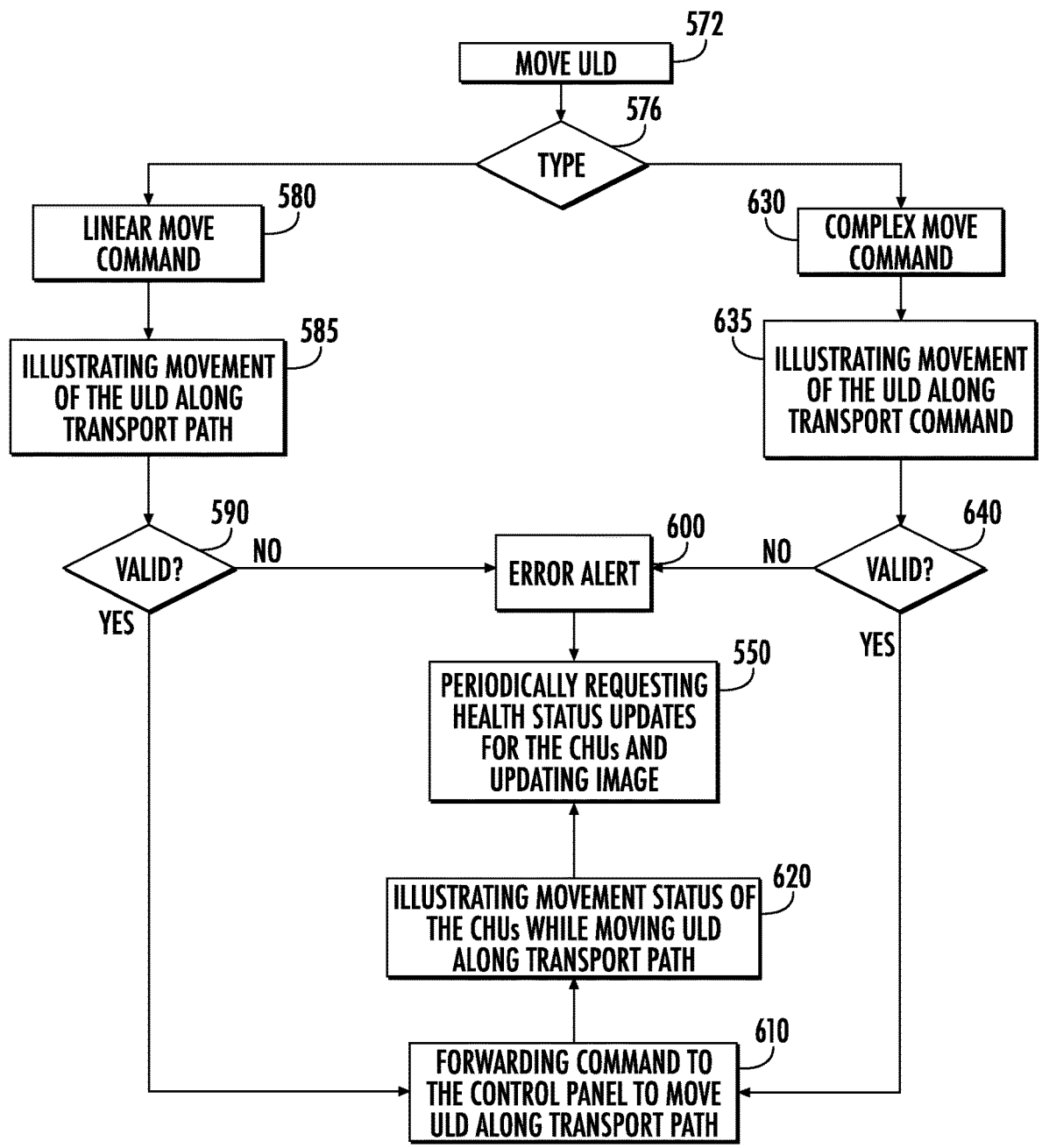
FIG. 19 shows a process of using a PCP to move a ULD according to an embodiment.

Turning to FIG. 19, the further details are disclosed for the embodiment related to block 572 of determining that the second gesture is a command to move the first ULD 100a into, out of, or within the first cargo compartment 110a (FIGS. 6-9). This determination is made when a single touchpoint (e.g., single fingertip) gesture is detected by the PCP 200, and the gesture initiates against an image of the first ULD 100a. The method includes block 576 of determining a type of movement command being received. In one embodiment, the method includes block 580 of determining the movement command is a linear or drag movement command 580 defining a transport path 210 (FIG. 8-9). The method further includes block 585 of illustrating on the PCP 200 phantom movement of the first ULD 100a along the transport path 210 providing a visual confirmation of movement of the first ULD 100a along the transport path 210.

The method further includes block 590 of determining whether the transport path 210 is valid (FIGS. 10-13). Block 590 may be executed contemporaneously with block 585. A transport path 210 may be invalid because movement of the first ULD 100a along the transport path cannot be completed. When the transport path is invalid (NO at block 590), the method further includes block 600 of providing an error alert by displaying an indicator 230 that the transport path is invalid. Then block 550 is again executed.

When the transport path 210 is valid (YES at block 590), the method further includes block 610 of forwarding a command to the first control panel 160a to move the first ULD 100a along the transport path 210 (FIGS. 8-9). The method further includes block 620 of illustrating an operational state of the plurality of CHUs 120 (running or standby) and a position of the first ULD 100a until the movement is complete. This provides visual confirmation of movement of the first ULD 100a along the transport path. To accomplish this action the PCP 200 communicates with the first control panel 160a while the first ULD 100a is being moved by the CHUs 120 along the transport path 210.

In one embodiment, when determining the type of gesture at block 576, the method includes block 630 of determining the second gesture is a command for complex movement, which is rotational and linear movement, of the first ULD 100a (FIGS. 6-7). The movement command provides a further transport path, as indicated, of rotating a first ULD 100a by ninety degrees and linearly moving the first ULD 100a along the further transport path that is into, within, or out of the cargo compartment. The rotation action is executed by the TUs 120b and the linear movement action is executed by both the TUs 120b and the PDUs 120a. The method includes block 635 of displaying on the PCP 200 the movement of the ULD 100 along the further transport path to serve as a visual confirmation of the further transport path.

The method further includes block 640 of determining whether the further transport path is valid (FIGS. 10-13). Block 640 may be executed contemporaneously with block 635. The further transport path 210 is invalid because the CHUs 120 along the further transport path are incapable of completing one or more actions under the further transport path. For example, if the cargo compartment 110 does not have TUs 120b, the further transport path is invalid. When the complex movement command is invalid (NO at block 640), the method again executes block 600 and block 550 illustrated in FIG. 19 and as disclosed above. When the complex movement command is valid (YES at block 640), the method again executes block 610 through block 550 illustrated in FIG. 19 and as disclosed above.

Figure 20:
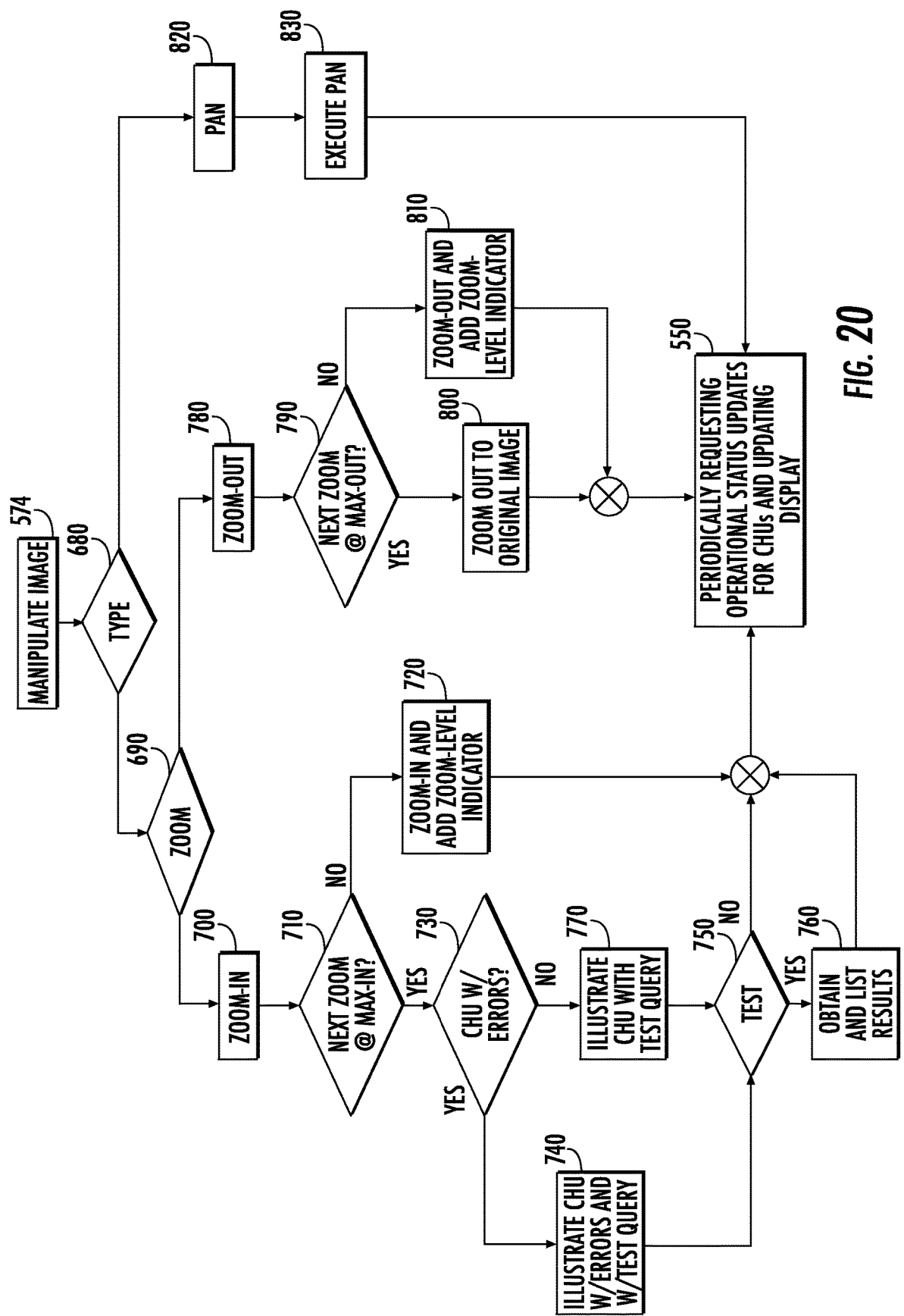
FIG. 20 shows a process of using a PCP to manipulate an image on a PCP according to an embodiment.

Turning to FIG. 20, the further details are disclosed for the embodiment related to block 574 of determining that the second gesture is a command to manipulate the displayed image on the PCP 200 (FIGS. 15-17). The method includes block 680 of determining a type of manipulation. In one embodiment, the method includes block 690 of determining the manipulation command is a zoom action (FIGS. 14-16). Such determination is made by detecting on the display a two-finger gesture.

In one embodiment, following block 690, the method includes block 700 of determining that the zoom command is a zoom-in command (FIGS. 14-15). According to an embodiment the method includes block 710 of determining if the next zoom-in level is a maximum zoom-in level. According to an embodiment, if the next zoom-in level is not the maximum zoom-in level (NO at block 710) then the method includes block 720 of zooming-in and providing a zoom-level indicator 250. Then block 550 is again executed. According to an embodiment, if the next zoom-in level is the maximum zoom-in level (YES at block 710) then the method includes block 730 of determining whether a CHU 120 proximate the zoom gesture origin is in a malfunctioning health state. If a CHU 120 proximate the zoom gesture origin is in a malfunctioning health state (YES at block 730) then the method includes block 740 of providing an updated display illustrating the malfunctioning CHU 120 along with maintenance data 260 for the malfunctioning CHU.

The method includes block 750 of displaying a query 270, which may be a radial button, of whether to instruct the first control panel 160a to run the diagnostic test on the malfunctioning CHU 120. In one embodiment no test is requested (NO at block 750) and then block 550 is executed. In one embodiment, a test is requested (YES at block 750), for example by an interactive gesture against a radial button 270. The method includes block 760 of obtaining and listing test results. If an error is detected a possible solution may be identified. Then block 550 is again executed.

In one embodiment if no CHU 120 proximate the zoom origin is in a malfunctioning state (NO at block 730) then the method includes block 770 of providing an updated display illustrating a CHU 120 proximate the zoom gesture origin and maintenance data for the CHU 120. In this execution, if a pair of CHUs 120 is proximate the zoom origin, the CHU 120 closest to the zoom gesture origin is provided in the updated display. Block 750 is again executed as a test of a CHU 120 may be desired even if an operational state is not a malfunctioning state.

In one embodiment, following block 690, the method includes block 780 of determining that the zoom command is a zoom-out command (FIG. 16). With a zoom-out command, two fingers on the display move in converging directions. Such motion may be considered a pinching motion. According to an embodiment the method includes block 790 of determining if the next zoom-out level is a maximum zoom-out level, which would be a complete image of a cargo compartment 110. According to an embodiment, if the next zoom-out level is the maximum zoom-out level (YES at block 790) then the method includes block 800 of rescaling the image so that a complete cargo compartment 110 is displayed. Then block 550 is again executed. If the next zoom-out level is not the maximum zoom-out level (NO at block 790) then the method may include block 810 of zooming-out to a next zoom level and displaying the zoom-level indicator 250. Then block 550 is again executed.

In one embodiment, following block 680, the method executes block 820 of determining that the command to manipulate the image is a pan command (FIG. 17). A pan command is, for example, a command to move an image of the first compartment 110a in accordance with a direction traced by a single touchpoint such as a finger. Such pan action may include left, right, forward, aft, and any combination thereof. The method includes block 830 of executing the pan command. After block 830, block 550 is again executed.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of operating a Portable Cargo Panel (PCP) for an aircraft, comprising:
    detecting an input command on a display of the PCP;
    determining that the input command is a command to view on the display a first cargo compartment, the first cargo compartment including a doorway, a first plurality of Cargo Handling Units (CHUs), and a first control panel operationally connected to the plurality of CHUs;
    securing a wireless connection with the first control panel;
    receiving, from the first control panel, a health state of each the plurality of CHUs;
    displaying, on the display, the image of the first cargo compartment with the doorway and each of the plurality of CHUs within the first cargo department, and the operational state of each of the plurality of CHUs;
    controlling one or more of the plurality of CHUs in the first cargo compartment by transmitting, to the first control panel, a command to control the plurality of CHUs to move a first Unit Load Device (ULD) from the doorway into the first cargo compartment by:
    detecting a touch gesture on the image of the first cargo compartment on the display, the touch gesture including one or more of an arc portion and a linear portion, wherein the gesture traces a path starting at the ULD at the doorway, over one or more of the CHUs and ending at another one of the CHUs to define a first transport path therebetween the doorway and the another one of the CHUs;
    determining that the touch gesture is a command for moving the first ULD along the first transport path from the doorway into the first cargo compartment to the another one of the CHUs;
    determining whether the first transport path is valid;
    when the first transport path is valid, forwarding a command to move the first ULD along the first transport path to the first control panel, whereby the first control panel commands the plurality of CHUs to move the ULD along the first transport path; and
    when the first transport path is invalid, displaying an error message.

2. The method of claim 1, further comprising:
    distinguishing on the display between:
        any CHU of the plurality of CHUs that is a Power Drive Unit (PDUs); and
        any CHU of the plurality of CHUs that is a Turntable Unit (TUs).

3. The method of claim 2, further comprising:
    periodically requesting, from the first control panel, health state updates for the plurality of CHUs in the first cargo compartment; and
    updating the display when changes in the health state of the plurality of CHUs is detected;
    wherein the operational state for the plurality of CHUs includes whether any one of the plurality of CHUB is operating normally; and malfunctioning.

4. The method of claim 1, further comprising:
    obtaining operational state updates for the plurality of CHUs from first control panel while the CHUs are moving the first ULD along the first transport path;

displaying the operational states for the plurality of CHUs while the CHUs are moving the first ULD along the first transport path;
wherein the operational states include:
running; and
standby.
5. The method of claim 4, further comprising:
obtaining a position of the first ULD from first control panel while the CHUs are moving the first ULD along the first transport path; and
displaying the position of the first ULD while the CHUs are moving the first ULD along the first transport path.
6. The method of claim 3, further comprising:
determining that the first transport path is invalid when:
another ULD is located along the first transport path; or
the plurality of CHUs located along the first transport path are unable to execute one or more movements of the ULD along the first transport path.
7. The method of claim 3, further comprising:
displaying a phantom image of the ULD moving along the first transport path before transmitting to the first control panel a command to move the ULD along the first transport path.
8. The method of claim 1, further comprising:
detecting another touch gesture on the display, the another touch gesture being a two-finger pinching motion;
determining the another touch gesture is a zoom-in gesture;
determining that a next zoom-in level is a maximum zoom-in level; and
determining that one of the plurality of CHUs proximate a zoom-in gesture is in a malfunctioning state; and
updating the display to illustrate:
the one of the plurality of CHUs that is malfunctioning; and
maintenance data for the one of the first plurality CHUs that is malfunctioning.
9. The method of claim 8, comprising:
displaying a query of whether to instruct the first control panel to run a diagnostic test on the one of the plurality of CHUs that is malfunctioning.

10. The method of claim 9, comprising:
receiving a command to instruct the first control panel to run the diagnostic test on the one of the plurality of CHUs that is malfunctioning;
instructing the first control panel to run the diagnostic test on the one of the plurality of CHUs that is malfunctioning;
receiving results of the diagnostic test from the first control panel; and
displaying the results of the diagnostic test including a suggestion for resolving any error detected by the diagnostic test.
11. The method of claim 1, further comprising:
detecting another gesture on the display, the another gesture being a two-finger pinching motion;
determining the another gesture is a zoom-in gesture;
determining that a next zoom-in level is a maximum zoom-in level;
determining that two CHUs of the plurality of CHUs are proximate the zoom gesture;
determining that neither the two CHUs is in a malfunctioning state;
determining that one of the two CHUs is closer to the zoom gesture than another of the two CHUs; and
updating the display to illustrate:
the one of the two CHUs that is closer to the zoom gesture than another of the two CHUs; and
maintenance data for the one of two CHUs.
12. The method of claim 11, further comprising:
displaying a query of whether to instruct the control panel to run a diagnostic test on the one of the plurality of CHUs.
13. A portable cargo panel (PCP) configured to execute the method of claim 1.
14. An aircraft system comprising:
a first cargo compartment;
the first cargo compartment including a first doorway, a plurality of Cargo Handling Units (CHUs) and a first control panel operationally connected to the plurality of CHUs; and
a portable cargo panel (PCP) configured to wirelessly communicate with the first control panel and execute the method of claim 1.

* * * * *